US009589542B2

(12) United States Patent
Lee et al.

(10) Patent No.: US 9,589,542 B2
(45) Date of Patent: *Mar. 7, 2017

(54) MOBILE TERMINAL AND METHOD OF CONTROLLING THE MOBILE

(71) Applicant: LG Electronics Inc., Seoul (KR)

(72) Inventors: Chulbae Lee, Seoul (KR); Jipyo Hong, Seoul (KR); Sungwon Shin, Seoul (KR); Hyolin Kim, Seoul (KR); Jiyeon Lee, Seoul (KR); Hyungtae Jang, Seoul (KR); Yoonchan Won, Seoul (KR); Yongjae Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/274,594

(22) Filed: May 9, 2014

(65) Prior Publication Data

US 2015/0062181 A1 Mar. 5, 2015

(30) Foreign Application Priority Data

Aug. 29, 2013 (KR) ........................ 10-2013-0103391

(51) Int. Cl.
*G06F 3/0488* (2013.01)
*G06F 1/16* (2006.01)
(Continued)

(52) U.S. Cl.
CPC .............. *G09G 5/38* (2013.01); *G06F 1/165* (2013.01); *G06F 1/1692* (2013.01);
(Continued)

(58) Field of Classification Search
CPC .... G06F 1/1647; G06F 3/0488; G06F 3/1423; G06F 1/1616; G06F 1/1643;
(Continued)

(56) References Cited

U.S. PATENT DOCUMENTS

2006/0238517 A1 10/2006 King et al.
2007/0232336 A1* 10/2007 Kim et al. ................. 455/466
(Continued)

FOREIGN PATENT DOCUMENTS

CN 101052179 10/2007
CN 1710917 5/2010
(Continued)

OTHER PUBLICATIONS

European Patent Office Application Serial No. 14173068.9, Search Report dated Dec. 22, 2014, 12 pages.
(Continued)

*Primary Examiner* — Jeffrey Chow
(74) *Attorney, Agent, or Firm* — Lee, Hong, Degerman, Kang & Waimey PC

(57) ABSTRACT

Provided is a mobile terminal including: a terminal body that has a first side and a second side; a first display that is located at the first side; a second display that is located at the second side; a sensor that is configured to detect rotation of the mobile terminal; and a controller that is configured to: cause the first display to display a first information; and cause the second display to display a second information when the sensor detects that the mobile terminal is rotated a threshold amount, such that a general direction that the first side faced prior to the rotating of the mobile terminal is generally the same as a general direction that the second side faces after the rotating of the mobile terminal, wherein the second information is related to the first information.

17 Claims, 21 Drawing Sheets

(51) Int. Cl.
    *G06F 3/0481*     (2013.01)
    *G09G 5/38*     (2006.01)
    *G06F 3/0346*     (2013.01)
    *G06F 3/0482*     (2013.01)
    *G06F 3/0485*     (2013.01)
    *G06F 3/0354*     (2013.01)

(52) U.S. Cl.
    CPC .......... *G06F 1/1694* (2013.01); *G06F 3/0346* (2013.01); *G06F 3/03547* (2013.01); *G06F 3/0482* (2013.01); *G06F 3/0485* (2013.01); *G06F 3/04817* (2013.01)

(58) Field of Classification Search
    CPC .... G06F 1/1637; G06F 3/0481; G06F 1/1626; H04M 2250/16; H04M 1/0247; H04M 1/0214; H04M 2250/12; H04M 1/0266; H04M 1/0245
    See application file for complete search history.

(56) References Cited

U.S. PATENT DOCUMENTS

| 2010/0125816 | A1* | 5/2010 | Bezos ........................... 715/863 |
| 2012/0235963 | A1* | 9/2012 | Oshinome ................ G09G 5/00 345/204 |
| 2013/0083358 | A1 | 4/2013 | Suzuki |
| 2013/0169545 | A1* | 7/2013 | Eaton .................. H04M 1/0241 345/173 |
| 2013/0187909 | A1* | 7/2013 | Park et al. .................... 345/419 |

FOREIGN PATENT DOCUMENTS

| CN | 1867631 | 10/2010 |
| WO | 2012/078079 | 6/2012 |

OTHER PUBLICATIONS

European Patent Office Application Serial No. 14173068.9, Search Report dated Jun. 27, 2016, 11 pages.

* cited by examiner (a)

(b)

(a)            (b)

|         | Me | John |
|---|---|---|
| AM 10:05 | MESSAGE RECEIVED FROM JOHN | MESSAGE SENT |
| AM 10:55 | MOBILE TERMINAL IS TURNED UPSIDE DOWN BEFORE STARTING MEETING AND SELECTIVE NO-DISTURBANCE MODE IS ACTIVATED | |
| AM 11:05 | NOT RECEIVED | CALL MADE |
| AM 11:07 | RECEIVED | MESSAGE SENT |

MOBILE TERMINAL AND METHOD OF CONTROLLING THE MOBILE

CROSS-REFERENCE TO RELATED APPLICATION

Pursuant to 35 U.S.C. §119(a), this application claims the benefit of earlier filing date and right of priority to Korean Application No. 10-2013-0103391, filed on Aug. 29, 2013, the contents of which is incorporated by reference herein in its entirety.

BACKGROUND OF THE DISCLOSURE

1. Field of the Disclosure

The present disclosure relates to a mobile terminal that is equipped with a display unit to which information is output.

2. Background of the Disclosure

A mobile terminal is a device that can be carried around and has one or more functions such as to perform voice and video call communications, inputting and outputting information, storing data, and the like.

As functions of the terminal become more diversified, the terminal can support more complicated functions such as capturing images or video, reproducing music or video files, playing games and receiving broadcast signals. By comprehensively and collectively implementing such functions, the mobile terminal may be embodied in the form of a multimedia player or a device.

Various attempts have been made to implement complicated functions in such a multimedia device by means of hardware or software. For instance, a user interface (UI), which allows a user to search or select functions in an easy and convenient manner, is being provided.

In addition, a user of the mobile terminal tends to consider his/her mobile terminal as a personal possession that characterizes his/her individuality, and this requires various design-reflected construction of the mobile terminal. The design-reflected construction includes changes and improvements in construction that are made to enable the user to use the mobile terminal in a more convenient manner. The display unit is considered as one of the components that need the changes and improvements in construction.

An arrangement of an operation unit in the front of the mobile terminal makes it difficult to slim down the mobile terminal and to design the mobile terminal in a simple manner. In addition, there occurs a problem in that a display region is reduced by the operation unit provided on a flank surface of the mobile terminal. Therefore, a new construction for an inputting method is considered in order to solve the problem.

SUMMARY OF THE DISCLOSURE

Therefore, an aspect of the detailed description is to provide a mobile terminal that is capable of outputting information to multiple display units in various ways.

Another aspect of the detailed description is to provide a mobile terminal in which a new user input different from one in the related art is possible.

To achieve these and other advantages and in accordance with the purpose of this specification, as embodied and broadly described herein, there is provided a mobile terminal including: a terminal body that has a front side and a rear side; a front display unit and a rear display unit that are configured in such a manner that the front display unit and the rear display unit are arranged on the front side and the rear side, respectively, and information is output to the front display unit and the rear display unit; a sensing unit that is configured to sense rotation of the terminal body; and a controller that outputs second information relating to first information to the front display unit when the terminal body is rotated in a state where the first information is output to the rear display unit.

In the mobile terminal, one of the front display unit and the rear display unit may be in an ON state and the other may be in an OFF state, and the ON state and the OFF state may be determined depending on whether or not the terminal body is rotated.

In the mobile terminal, the front display unit may be in the OFF state while the first information is output to the rear display unit, and corresponding to the rotation of the terminal body, the front display unit may be switched to the ON state and the rear display unit may be switched to the OFF state.

In the mobile terminal, the first information may be alerting information that alerts a user that an event occurs, and the second information may be information on contents of the event that occurs.

In the mobile terminal, the controller may perform a specific function relating to the event when a touch corresponding to a predetermined manner is applied to a bezel portion surrounding the front display unit in a state where the second information relating to the first information is displayed on the front display unit.

In the mobile terminal, if the event that occurs is a message receiving event, a graphic object that alerts the user that a message is received may be output to the rear display unit, and corresponding to the rotation of the terminal body, contents of the received message may be output to the front display unit.

In the mobile terminal, when a multi touch applied to a bezel portion surrounding the front display unit is sensed in a state where the contents of the received message is output to the front display unit, an input window for responding to the received message may be output to the front display unit.

In the mobile terminal, in a state where the first information is output to the rear display unit, corresponding to the rotation of the terminal body, the controller may determine whether or not to output the second information to the front display unit, based on a touch applied to the rear display unit.

In the mobile terminal, when the terminal body is rotated in a state where the first information that alerts a user to an occurrence of an event is output to the rear display unit, the controller may perform a function relating to the event, In the mobile terminal, the second information may be screen information corresponding to the performed function.

In the mobile terminal, if the event that occurs is a call receiving event during the user's absence, alerting information that alerts a user that a call is received during the user's absence may be output to the rear display unit, and corresponding to the rotation of the terminal body, the screen information relating to making a call responding to the call that is received during the user's absence may be output to the front display unit.

In the mobile terminal, the sensing unit may be formed in such a manner to sense a rotation direction of the terminal body, and the controller may perform different functions according to the rotational direction of the terminal body.

In the mobile terminal, when the terminal body is rotated in a first direction, a first function relating to the event may be performed, and when the terminal body is rotated in a second direction different from the first direction, a second function different from the first function relating to the event may be performed.

In the mobile terminal, multiple icons corresponding to the first function and the second function, respectively, may be output to the rear display unit.

In the mobile terminal, when the terminal body is rotated, the first information may be moved toward the icon corresponding to the rotation direction of the terminal body, among the multiple icons.

In the mobile terminal, while being moved toward the icon, the first information may gradually disappear from the rear display unit, and when the first information disappears to a predetermined extent or above, the first function may be performed.

In the mobile terminal, in a state where multiple events occur and information relating to one event, among the multiple events, is output to the rear display unit, when a touch corresponding to a predetermined manner is applied to the rear display unit, the information relating to the one event may be switched to information relating to a different event.

In the mobile terminal, the touch corresponding to the predetermined manner may be a flicking touch, corresponding to the flicking touch, the information relating to the one event may disappear from the rear display unit, and corresponding to the disappearance of the information relating to the one event, the information relating to the different event may be output.

In the mobile terminal, the touch corresponding to the predetermined manner may be a flicking touch, and the controller may determine information relating to an event that is to be output to the rear display unit, based on a direction of the flicking touch applied to the rear display unit.

In the mobile terminal, when the flicking touch in a first direction is applied to the rear display unit, a different event that is in the same category as the one event, among the multiple events, may be output to the rear display unit, and when the flicking touch in a second direction different from the first direction is applied to the rear display unit, a different event that is in a different category than the one event, among the multiple events, may be output to the rear display unit.

According to another aspect of the present invention, there is provided as a mobile terminal including: a first display unit and a second display unit that are configured in such a manner that the first display unit and the second display unit are arranged on both sides of a terminal body, respectively, and information is output to the first display unit and the second display unit; a sensing unit that is configured to sense rotation of the terminal body; and a controller that performs control to determine whether or not second information relating to an event that occurs is output to the second display unit, using a relationship between the event that occurs and first information, when the event occurs after the terminal body is rotated in a state where the first information is output to the first display unit.

In the mobile terminal, in a state where the first information is output to the first display unit, corresponding to the rotation of the terminal body, the controller may determine whether or not to output the second information to the second display unit, based on a touch applied to the first display unit.

In the mobile terminal, the outputting of the second information relating to the first information may be performed if the event relating to the first information occurs a number of multiple times.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings:

FIGS. 22A and 22B are diagrams illustrating the operation of the mobile terminal according to one embodiment of the present invention, which is illustrated in FIG. 19.

DETAILED DESCRIPTION OF THE DISCLOSURE

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, a mobile terminal according to the present invention will be explained in more detail with reference to the attached drawings. A singular expression used in the present invention includes a plural meaning unless it is obviously defined. The suffixes attached to components, such as 'module' and 'unit or portion' were used for facilitation of the detailed description of the present invention. Therefore, the suffixes do not have different meanings from each other.

The mobile terminal according to the present disclosure may include a portable phone, a smart phone, a laptop computer, a digital broadcasting terminal, Personal Digital Assistants (PDA), Portable Multimedia Player (PMP), an E-book, a navigation system, etc.

Figure 1:
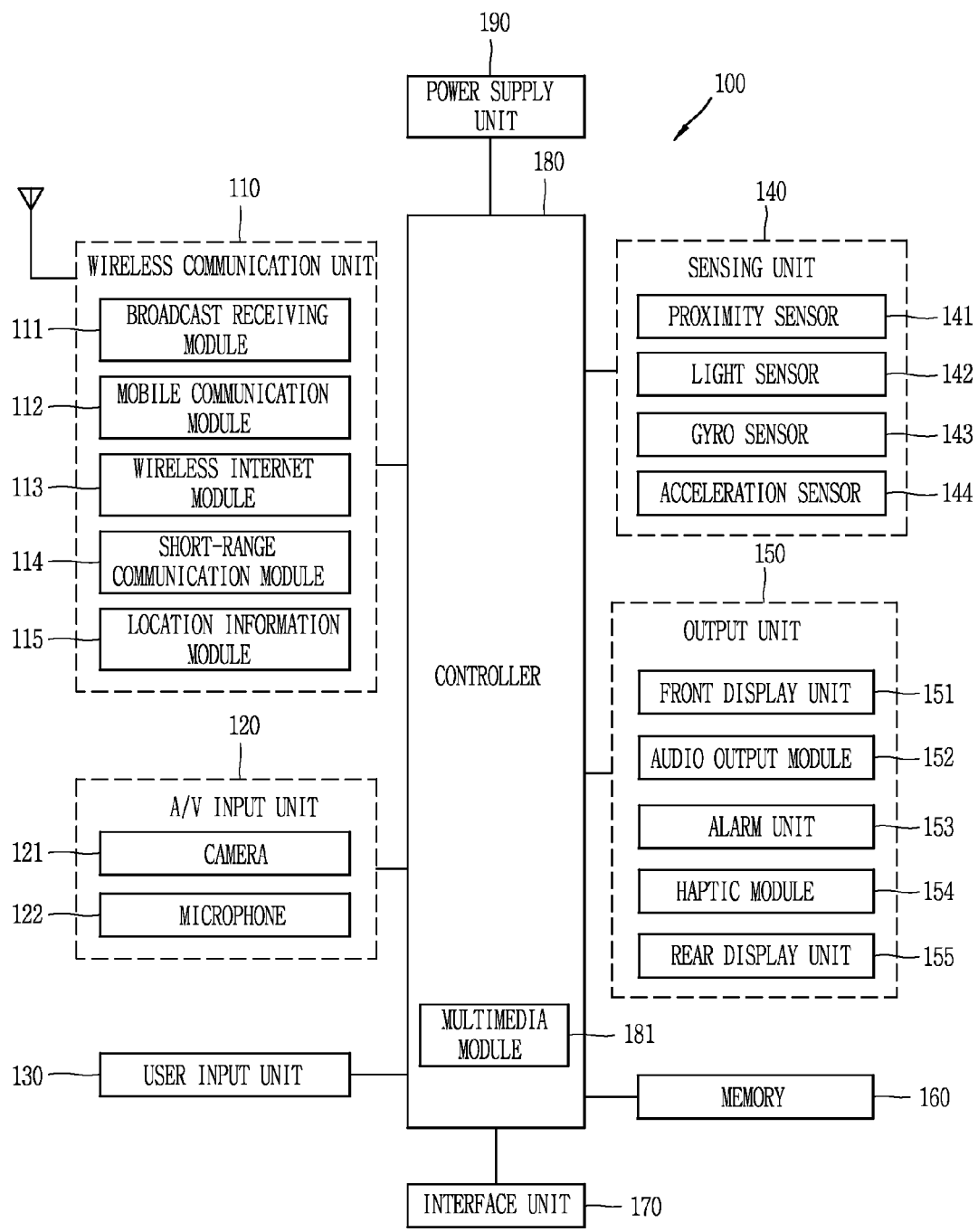
FIG. 1 is a block diagram of a mobile terminal according to one embodiment of the present invention.

FIG. 1 is a block diagram of a mobile terminal 100 according to one embodiment of the present disclosure.

The mobile terminal 100 may comprise components, such as a wireless communication unit 110, an Audio/Video (NV) input unit 120, a user input unit 130, a sensing unit 140, an output unit 150, a memory 160, an interface unit 170, a controller 180, a power supply unit 190, and the like. FIG. 1 shows the mobile terminal 100 having various components, but it is understood that implementing all of the illustrated components is not a requirement. Greater or fewer components may alternatively be implemented.

Hereinafter, each component is described in sequence.

The wireless communication unit 110 may typically include one or more components which permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless internet module 113, a short-range communication module 114, a position information module 115 and the like.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcasting signals and/or broadcasting associated information received through the broadcast receiving module 111 may be stored in the memory 160.

The mobile communication module 112 transmits/receives wireless signals to/from at least one of network entities (e.g., base station, an external terminal, a server, etc.) on a mobile communication network. Here, the wireless signals may include audio call signal, video call signal, or various formats of data according to transmission/reception of text/multimedia messages.

The wireless internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), World Interoperability for Microwave Access (Wimax), High Speed Downlink Packet Access (HSDPA), and the like.

The short-range communication module 114 denotes a module for short-range communications. Suitable technologies for implementing this module may include BLUETOOTH, Radio Frequency IDentification (RFID), Infrared Data Association (IrDA), Ultra-WideBand (UWB), ZigBee, and the like.

The position information module 115 denotes a module for sensing or calculating a position of a mobile terminal. An example of the position information module 115 may include a Global Position System (GPS) module.

Referring to FIG. 1, the A/V input unit 120 is configured to receive an audio or video signal. The A/V input unit 120 may include a camera 121, a microphone 122 or the like. The camera 121 processes image data of still pictures or video acquired by an image capture device in a video capturing mode or an image capturing mode. The processed image frames may be displayed on a front display unit 151 or a rear display unit 155.

The image frames processed by the camera 121 may be stored in the memory 160 or transmitted via the wireless communication unit 110. The camera 121 may be provided in two or more according to the configuration of the mobile terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 may include a keypad, a dome switch, a touch pad (e.g., a touch sensitive member that detects changes in resistance, pressure, capacitance, etc. due to being contacted) a jog wheel, a jog switch, and the like.

The sensing unit 140 detects a current status (or state) of the mobile terminal 100 such as an opened or closed state of the mobile terminal 100, a location of the mobile terminal 100, the presence or absence of user contact with the mobile terminal 100, the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is open or closed. In addition, the sensing unit 140 can detect whether or not the power supply unit 190 supplies power or whether or not the interface unit 170 is coupled with an external device. The sensing unit 140 may include a proximity sensor 141.

The output unit 150 is configured to provide outputs in a visual, audible, and/or tactile manner. The output unit 150 may include the front display unit 151, an audio output module 152, an alarm unit 153, a haptic module 154, and the like.

The front display unit 151 may display information processed in the mobile terminal 100. For example, when the mobile terminal 100 is in a phone call mode, the front display unit 151 may display a User Interface (UI) or a Graphic User Interface (GUI) associated with a call or other communication (such as text messaging, multimedia file downloading, etc.). When the mobile terminal 100 is in a video call mode or image capturing mode, the front display unit 151 may display a captured image and/or received image, a UI or GUI that shows videos or images and functions related thereto, and the like.

The front display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like.

Some of these displays may be configured to be transparent so that outside may be seen therethrough, which may be referred to as a transparent display. A representative example of the transparent display may include a Transparent Organic Light Emitting Diode (TOLED), and the like. The rear surface portion of the front display unit 151 may also be implemented to be optically transparent. Under this configuration, a user can view an object positioned at a rear side of a terminal body through a region occupied by the front display unit 151 of the terminal body.

The front display unit 151 may be implemented in two or more in number according to a configured aspect of the mobile terminal 100. For instance, a plurality of displays may be arranged on one surface integrally or separately, or may be arranged on different surfaces.

Here, if the front display unit 151 and a touch sensitive sensor (referred to as a touch sensor) have a layered structure therebetween, the structure may be referred to as a touch screen. The front display unit 151 may be used as an input device rather than an output device. The touch sensor may be implemented as a touch film, a touch sheet, a touch pad, and the like.

The touch sensor may be configured to convert changes of a pressure applied to a prescribed part of the front display unit 151, or a capacitance occurring from a prescribed part of the front display unit 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the front display unit 151 has been touched.

Referring to FIG. 1, a proximity sensor 141 may be arranged at an inner region of the mobile terminal blocked by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, and so on.

The alarm unit 153 may provide outputs to inform about the occurrence of an event of the mobile terminal 100. Typical events may include call reception, message reception, key signal inputs, a touch input, etc. In addition to audio or video outputs, the alarm unit 153 may provide outputs in a different manner to inform about the occurrence of an event. The video signal or the audio signal may be output via the front display unit 151 or the audio output module 152. Accordingly, the front display unit 151 or the audio output module 152 may be classified as a part of the alarm unit 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100.

The rear display unit 155 corresponding to the front display unit 151 is provided on a rear surface of the mobile terminal 100. The rear display unit 155 may have a smaller size than the front display unit 151, and may be configured to display comparatively simple information.

The memory 160 may store a program for the processing and control of the controller 180. Alternatively, the memory 160 may temporarily store input/output data (e.g., phonebook data, messages, still images, video and the like). Also, the memory 160 may store data relating to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), a Universal Subscriber Identity Module (USIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply unit 190 serves to supply power to each component by receiving external power or internal power under control of the controller 180.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

Referring back to the user input unit 130, the user input unit 130 may be arranged on a rear surface of the mobile terminal 100, so that the front display unit 151 can have a larger screen. Hereinafter, a detailed structure where the user input unit 130 is arranged on the rear surface of the mobile terminal 100, and an operation of the mobile terminal 100 under such structure will be explained.

Figure 2A:
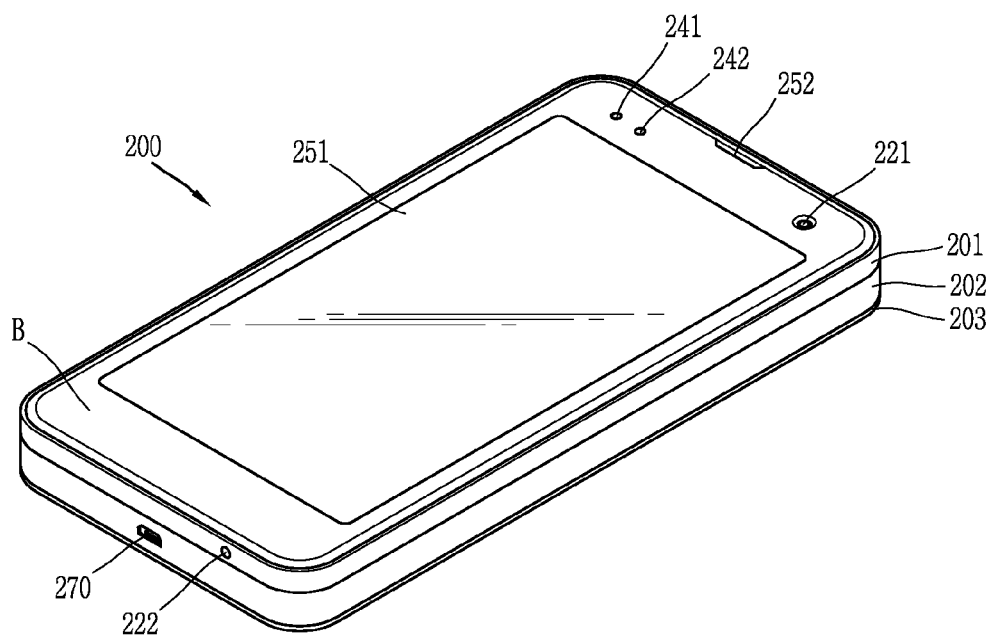
FIG. 2A is a perspective diagram of the mobile terminal according to one embodiment of the present invention, when viewed from the front.
Figure 2B:
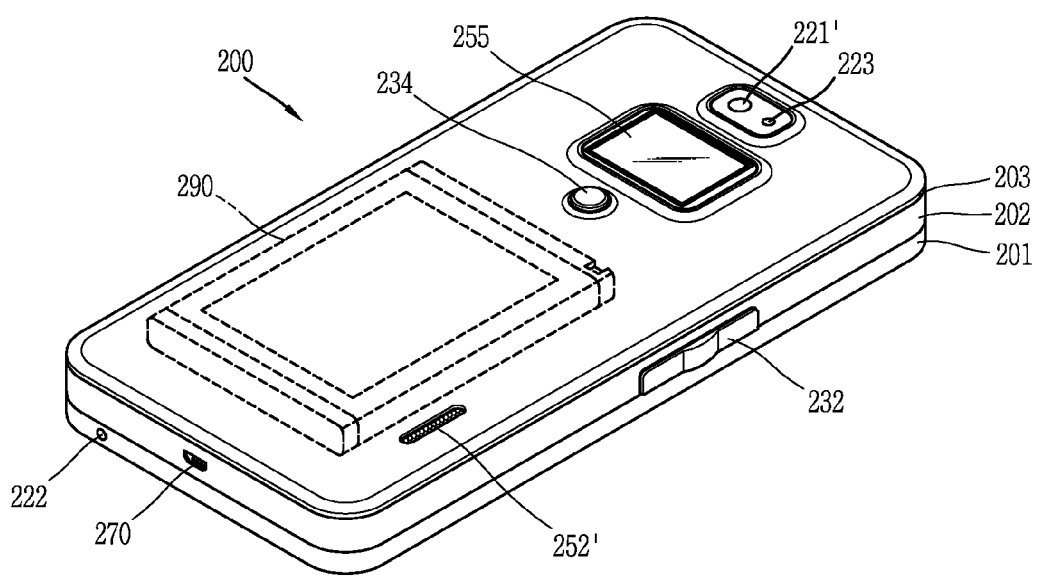
FIG. 2B is a perspective diagram of the mobile terminal illustrated in FIG. 2A, when viewed from the rear.

FIG. 2A is a front perspective view of a mobile terminal 200 according to an embodiment of the present invention, and FIG. 2B is a rear perspective view of the mobile terminal 200 of FIG. 2A.

The mobile terminal 200 according to the present invention is a bar type mobile terminal. However, the present invention is not limited to this, but may be applied to a slide type and a folder type in which two or more bodies are coupled to each other so as to perform a relative motion, a swing type, a swivel type, etc.

A case (casing, housing, cover, etc.) which forms an appearance of a terminal body may include a front case 201, a rear case 202 and a battery cover 203. Various components may be accommodated in a space formed by the front case 201 and the rear case 202. One or more middle cases may be additionally disposed between the front case 201 and the rear case 202.

Such cases may be formed by injection-molded synthetic resin, or may be formed using a metallic material such as stainless steel (STS), titanium (Ti) and aluminum (Al).

A front display unit 251, an audio output module 252, a camera module 221, etc. may be disposed on the terminal body, mainly on the front case 201. A microphone 222, a side input unit 232, an interface unit 270, etc. may be disposed on side surfaces of the front case 201 and the rear case 202.

The front display unit 251 occupies most parts of a front surface of the front case 201. That is, the front display unit 251 is disposed on the front surface of the terminal body, and is configured to output visual information. The audio output module 252 and the camera module 221 may be disposed at a region close to one end of the front display unit 251, and a front input unit 231 may be disposed at a region close to another end of the front display unit 251.

The front input unit 231, one example of the user input unit 130 (refer to FIG. 1) may include a plurality of manipulation units. The manipulation units may be referred to as manipulating portions, and may include any type of ones that can be manipulated in a user's tactile manner. In this embodiment, the front input unit 231 is configured as a touch key. However, the present invention is not limited to this. That is, a push key may be added to the front input unit 231.

The front display unit 251 may implement a touch screen together with a touch sensor. In this case, the touch screen may serve as the user input unit 130. Under such configuration, the front surface of the mobile terminal may not be provided with the front input unit 231. In this case, an input to the terminal body 200 may be performed through the front display unit 251 and a rear input unit 233 to be explained later.

The side input unit 232, an example of the user input unit 130 may be used to input a command such as controlling a size of an audio output from the audio output module 252, or a command such as converting the current mode of the front display unit 251 into a touch recognition mode.

Referring to FIG. 2B, a camera module 221' may be additionally mounted to the rear surface of the terminal body, i.e., the rear case 202. The camera module 221' faces a direction which is opposite to a direction faced by the camera module 221 (refer to FIG. 2A), and may have pixels different from those of the camera module 221.

For example, the camera module 221 on the front surface may operate with relatively lower pixels (lower resolution). Thus, the camera module 221 may be useful when a user can capture his or her face and send it to a calling party in a video call mode or the like. On the other hand, the camera module 221' on the rear surface may operate with a relatively higher pixels (higher resolution) such that it can be useful for a user to obtain higher quality pictures for later use. The camera modules 221 and 221' may be installed at the terminal body so as to rotate or pop-up.

A flash 223 and a mirror (not shown) may be additionally disposed close to the camera module 221'. When capturing an object by using the camera module 221', the flash 223 provides light to the object. The mirror can cooperate with the camera module 221' to allow a user to photograph himself or herself in a self-portrait mode.

An audio output unit 252' may be additionally disposed on the rear surface of the terminal body. The audio output module 252' on the rear surface may implement a stereo function together with the audio output module 252 on the front surface (refer to FIG. 2A), and may be used for calling in a speaker phone mode.

A power supply unit 290 for supplying power to the mobile terminal 200 is mounted to the terminal body. The power supply unit 290 may be mounted in the terminal body, or may be detachably mounted to the terminal body.

Referring back to the user input unit 130, according to the present invention, the user input unit 130 is arranged in the rear surface of the mobile terminal and thus a front display is formed as a larger screen. A structure in which the user input unit 130 is arranged in the rear surface and an operation that results from the structure are described in detail below.

FIG. 2A is a perspective view illustrating one example of a mobile terminal 200 according to the present invention when viewed from the front. FIG. 2B is a perspective view of the mobile terminal illustrated 200 illustrated in FIG. 2A when viewed from the rear.

The mobile terminal 200 disclosed includes a terminal body in the form of a bar. However, the present invention is not limited to the terminal body in the form of a bar, and can be applied to various structures in which two or more bodies are coupled to one another in such a manner as to move relative to one another, such as a slide type, a folder type, a swing type, and a swivel type.

The terminal body includes a case (a casing, a housing, a cover or the like) that makes up an exterior appearance. According to the present embodiment, the case includes a front case 201, a rear case 202 and a battery cover 203. Various elements are built into a space formed between the front case 201 and the rear case 202. At least one middle case may be additionally provided between the front case 201 and the rear case 202.

The cases may be formed from synthetic resin through the use of injection molding or may be formed from metal such as stainless steel (STS), Titanium (Ti), or aluminum (Al).

A front display unit 251, an audio output module 252, a camera module 221, and the like are provided in the terminal body, mainly, in the front case 201. A microphone 222, a lateral input unit 232, an interface 270, and the like are provided on flank surfaces of the front case 201 and the rear case 202.

The front display unit 251 takes up most of the main surface of the front case 201. That is, the front display unit 251 is provided in the front of the terminal body and is formed in such a manner that visual information is output to the front display unit 251. The audio output module 252 and the camera module 221 are provided in a region, adjacent to one end portion of the terminal body, of a bezel portion surrounding the front display unit 251.

On the other hand, although not illustrated, a front input unit is provided in a region, adjacent to the other end portion of the terminal body, of the bezel portion. The front input unit includes multiple operation parts as one example of the user input unit 130 (refer to FIG. 1). The operation parts are collectively referred to as an operation unit, and whatever manner gives the user a tactile feeling in operating the operation unit can be employed for the operation unit. For example, the front input unit is configured from a combination of a touch key and a push key.

In FIGS. 2A and 2B, the mobile terminal 200 is illustrated in which the front input unit is provided in the bezel portion. In this case, the front display unit 251 is formed as a touch screen and this is one configuration of the user input unit 130. That is, the mobile terminal 200 is configured in such a manner that application of an input operation to the terminal body is possible only through the front display unit 251 and a rear display unit 255 described below.

The lateral input unit 232 is configured as another example of the user input unit 130. A command, such as one for adjusting a volume of sound that is output from the audio output module 252, or one for switching to a touch recognition mode in the front display unit 251, is input into the lateral input unit 232.

Referring to FIG. 2B, a camera module 221' is additionally mounted on the rear surface of the terminal body, that is, on the rear case 202. The camera module 221' is substantially opposite in photographing direction to the camera 221 (refer to FIG. 2A) and has different pixels than the camera module 221.

For example, the front camera 221 preferably should have the small number of pixels to such an extent that an image of the user's face is practically captured for transmission to the other party at the other end, for example, during video communication, and the rear camera 221' preferably should have the large number of pixels because an image of a usual photographic subject is frequently captured and the captured image does not need to be transmitted immediately most of the time. The camera modules 221 and 221' may be provided in the terminal body in such a manner that they are rotatable with respect to the body or pop out of the terminal body.

A flash 223 and a mirror (not illustrated) are additionally provided adjacent to the camera module 221'. The flash 223 illuminates the photographic subject when photographing the photographic subject with the camera module 221'. When photographing him/her with the camera module 221' (self-photographing), the mirror is used for the user to take a look at his/her reflection, such as his/her face, in the mirror.

An audio output module 252' may be additionally provided on the rear surface of the terminal body. The rear audio output module 252' realizes a stereo audio function, along with the front audio output module 252 (refer to FIG. 2A) and may be used to activate a speakerphone mode during a telephone call.

The power supply unit 290 for supplying electricity to the mobile terminal 200 is mounted on the terminal body. The power supply unit 290 is built into the terminal body or is configured to removably attached from the outside directly to the terminal body.

As illustrated, the rear display unit 255 is provided on the rear surface of the terminal body. The rear display unit 255 is positioned, for example, adjacent to the camera module 221'.

The rear display unit 255 is configured in such a manner that the visual information is output to the rear surface of the terminal body. The rear display unit 255 is configured in such a manner that a command for controlling operation of the mobile terminal 200 is input into the rear display unit 255. For example, the rear display unit 255 is configured as another example of the user input unit 130. Commands, such as ones for performing power-on/off, starting, termination, and scrolling, are input into the rear display unit 255. Alternatively, the command, such as the one for adjusting the volume of sound that is output from the audio output module 252 and 252', or the one for switching to the touch recognition mode in the front display unit 251, is input into the rear display unit 255.

In FIGS. 2A and 2B, the rear display unit 255 is illustrated as being configured to include a rear display 255b and correspond to the front display unit 251. In this configuration, a touch input and a push input are possible. A configuration of the rear display unit 255 is described in more detail below.

Figure 3:
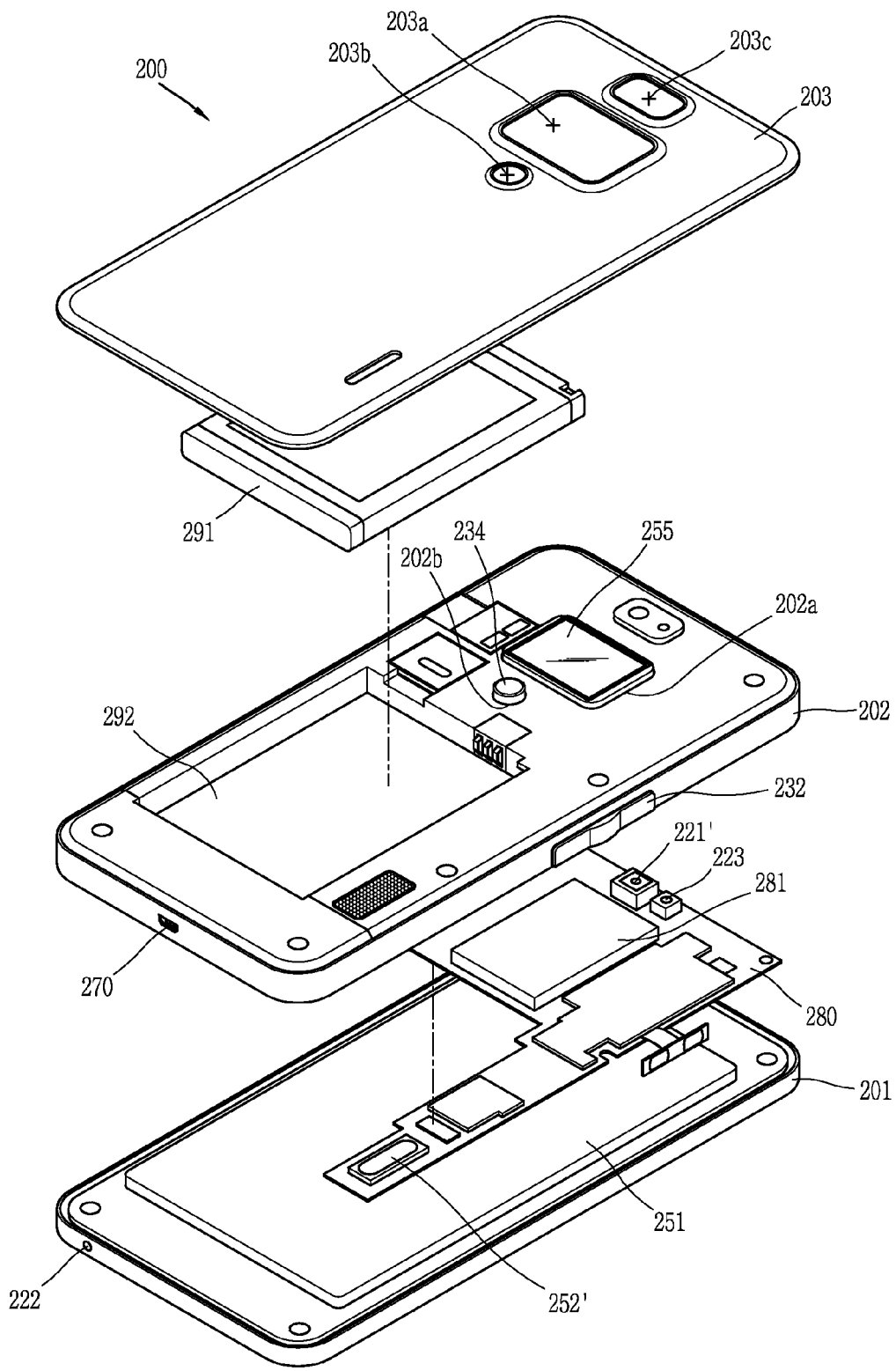
FIG. 3 is an exploded diagram of the mobile terminal illustrated in FIG. 2B.

FIG. 3 is an exploded diagram of the mobile terminal 200 illustrated in FIG. 2B.

Referring to FIG. 3, a printed circuit board (PCB) 280 is built into the terminal body. The printed circuit board 280 is mounted, for example, on the front case 201 or the rear case 202 or is mounted on a separate structural element. The separate structural element may be the middle case (not illustrated). As one example, a structure in which the front case 201 and the rear case 202 are separately provided is described below, but the present invention is not limited to the structure, and the cases 201 and 202 can be integrally formed into one piece.

The printed circuit board 280 is configured as one example of the controller 180 (refer to FIG. 1) for performing various functions of the mobile terminal 200. The multiple printed circuit boards 280 are provided and a combination of the two or more printed boards may function as the controller 180. In order to perform this function, various electronic elements are mounted on the printed circuit board 280.

An accommodation unit 292 that accommodates the battery 291 is formed in the rear case 202, and the battery cover 203 is removably attached to the rear case 202 in such a manner as to cover the accommodation unit 292. Unlike in the structure in which the battery 291 can be removably attached, the battery 291 may be configured in such a manner that it is built into the terminal body and thus cannot be attached to and detached from the terminal body.

As illustrated, the camera module 221' is electrically connected to the printed circuit board 280. The camera module 221' is equipped with a lens unit that captures an image through a lens and is configured to be exposed through the rear surface of the terminal body to capture an external image.

The rear display unit 255 that is formed in such a manner that the visual information is output to the real display unit 255 is provided is in the rear surface of the terminal body. The rear display unit 255 may be configured to receive a control command. Through holes 202a and 203a corresponding to the rear display unit 255 are formed in the rear case 202 and the battery cover, respectively.

The rear display unit 255 is arranged to be superimposed on the front display unit 25 in the front, in the thickness direction of the terminal body. As one example, the rear display unit 255 is arranged an upper end portion of the rear surface of the terminal body in such a manner that the user can operate the mobile terminal with his/her index finger when taking hold of the terminal body with his/her one hand. However, the present invention is not limited to this arrangement, and a position of the rear display unit 255 can be changed.

The rear display unit 255 is provided on the rear surface of the terminal body, and using this, a new type of user interface can be realized. In addition, if the rear display unit 255 substitutes for at least some functions of keys provided on the existing front surface of the existing mobile terminal and thus the front input unit is not arranged in the front, the front display unit 251 in the front is configured as a larger screen.

A detailed structure of the rear display unit 255 is specifically described below.

Figure 4A:
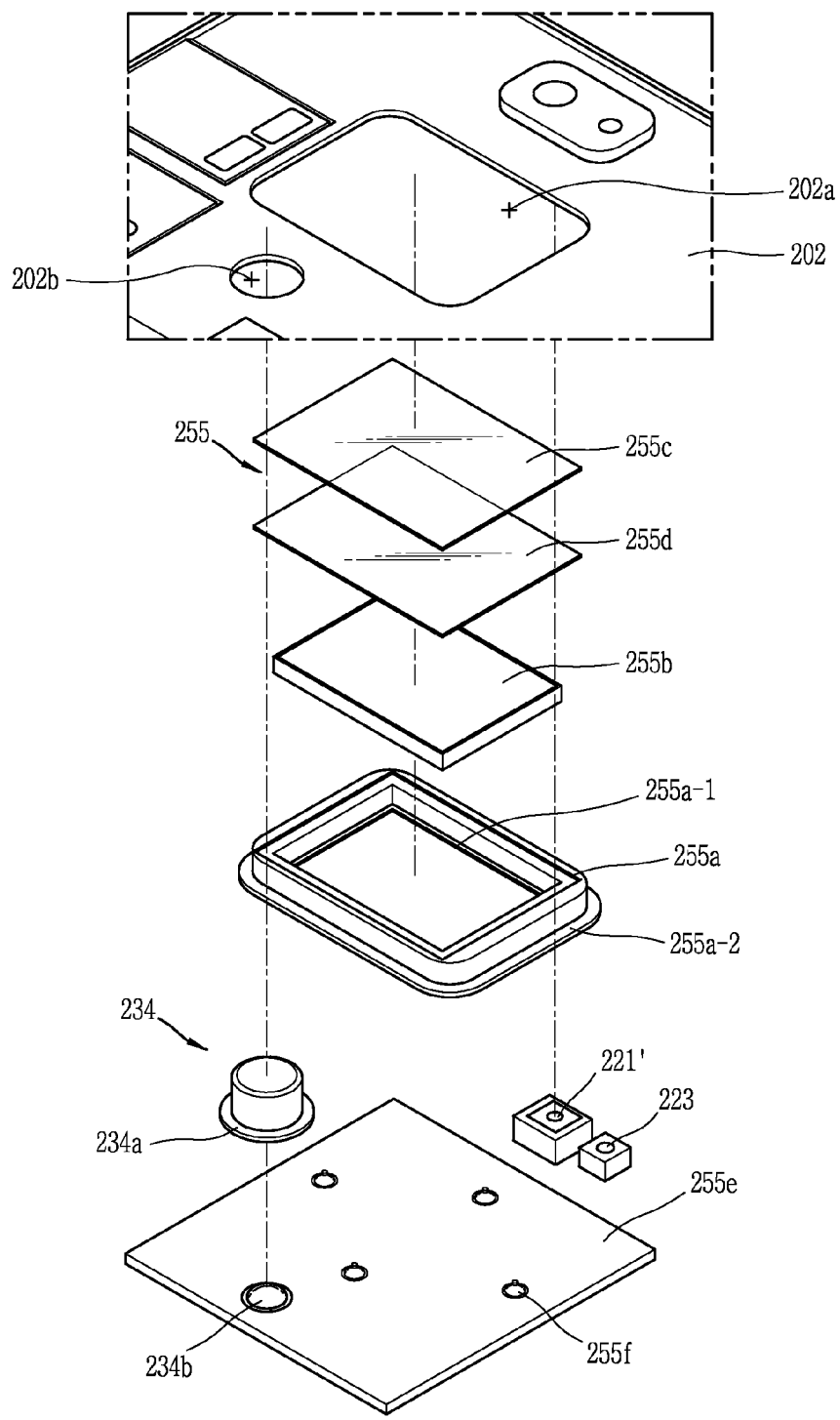
FIG. 4A is a detailed exploded diagram of a display unit when viewed from the rear and a user input unit, which are illustrated in FIG. 3.
Figure 4B:
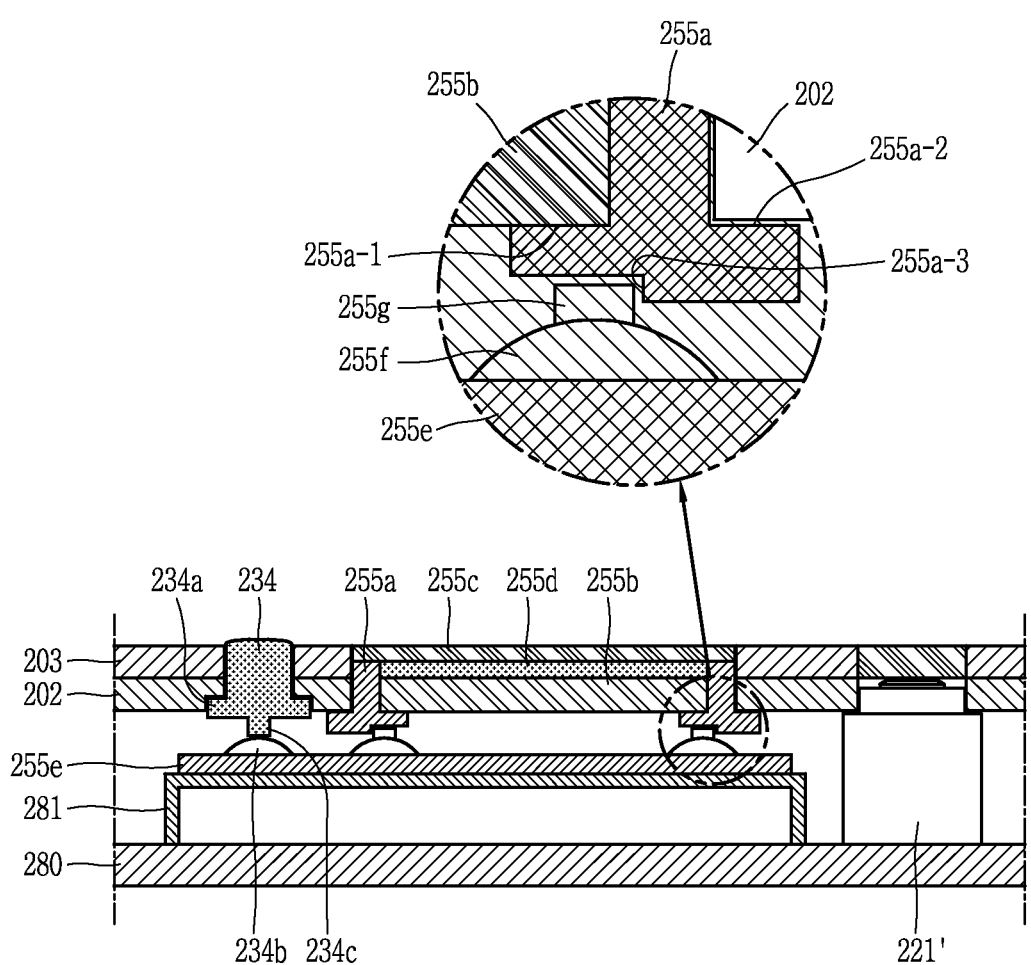
FIG. 4B is a cross-sectional diagram of the display unit when viewed from the rear and the user input unit, which are illustrated in FIG. 3.

FIG. 4A is a detailed exploded diagram of the rear display unit 255 illustrated in FIG. 3. FIG. 4B is a cross-sectional diagram of the rear display unit 255 illustrated in FIG. 3.

Referring to FIGS. 4A and 4B, along with preceding FIG. 3, the rear display unit 255 includes a frame 255*a* and the rear display 255*b*.

The frame 255*a* is installed in a case of the terminal body, for example, in the rear case 202, as illustrated, in such a manner that a push-down operation is possible. The push-down operation includes not only an operation in which exertion of a pressure against a center portion of the frame 255*a* moves the entire frame 255*a* downward, but also a tilting operation in which the frame 255*a*, which a pressure is exerted against one side thereof, is tilted. A projection portion 255*a*-2 is protrusively formed on an outer edge of the frame 255*a* and is configured in such a manner that the frame 255*a* can be locked under a rear surface of the rear case 202. The frame 255*a* has an accommodating portion 255*a*-1 that forms a space in which the rear display 255*b* is held in place.

The visual information that is output from the front display unit 251 is formed in such a manner that the visual information is changed by the push-down operation of the frame 255*a*. Accordingly, the user can change the visual information by controlling the front display unit 251 through the push-down operation of the rear frame 255*a* also while viewing without any obstruction the visual information that is output from the front display unit 251.

According to the present embodiment, a configuration is illustrated in which the frame 255*a* is tilted and thus the push-down operation can be performed on the frame 255*a*. Specifically, the frame 255*a* is configured in such a manner that the frame 255*a*, when the pressure is exerted against one side thereof, is tilted and this exerts a pressure against a side switch 255*f* corresponding to the one side thereof. The side switch 255*f* is arranged in such a manner as to correspond to every corner of the frame 244*a* or to every spacing between each corner. In FIGS. 4A and 4B, it is illustrated that the frame 255*a* is formed in the form of a rectangle and an edge portion corresponding to each side is configured in such a manner that it can be tilted and that the side switch 255*f* is arranged in every middle part of the edge portion.

The frame 255*a* is configured to generate different control command according to a tilting direction. In FIGS. 4A and 4B, if the frame 255*a* is formed in the form of a rectangle and the edge portion corresponding to each side, the frame 255*a* functions as a volume key, a vertical and horizontal direction key, or the like.

The controller 180 performs the push-down operation of the frame 255*a* with different control commands according to an operational mode of the mobile terminal 200. For example, in an Internet search mode, a document view mode, or the like, if the frame 255*a* is tilted toward both sides of the lengthwise direction of the terminal body, a scroll function is performed, and if the frame 255*a* is tilted toward both sides of the width direction of the terminal body, a page turning function is performed. In contrast, in a music reproduction mode, a moving image reproduction mode, or the like, if the frame 255*a* is tilted toward both sides of the lengthwise direction of the terminal body, a function associated with volume adjustment is performed, and if the frame 255*a* is tilted toward both sides of the width direction of the terminal body, a function associated with reproduction list turning is performed.

A side actuator 255*g*, which is configured in such a manner that the exertion of the pressure against one side of the frame 255*a* results in the exertion of a pressure against the side switch 255*f*, is mounted on an upper end portion of the side switch 255*f*. The side actuator 255*g* is formed in such a manner that it is integrated into the side switch 255*f* and thus the tilting of the frame 255*a* does not exert the pressure against an exact point on the side switch 255*f*, thereby improving a phenomenon in which the side switch 255*f* is not pressed. The side actuator 255*g* desirably should be formed of such a material as rubber, silicone, or urethane to prevent slippage when the side actuator 255*a* comes into contact with the frame 255*a*.

If the tilting of the frame 255*a* exerts a pressure against the side actuator 255*g*, an upward force and a sideways force that exert the pressure against the side switch 255*f* are exerted against the side actuator 255*g*. As a result, there is concern that frequent tilting operations would decrease durability of the side actuator 255*g*. To solve this, the frame 255*a* has a support portion 255*a*-3 that is formed in such a manner as to recess into a rear surface facing the side switch 255*f* and thus cover one portion of the external surface of the side actuator 255*g*. The support portion 255*a*-3 is configured to prevent the tilting of the frame 255*a* from transforming the side actuator 255*g* in the sideways direction.

The rear display 255*b* is mounted on the accommodating portion 255*a*-1 and is formed in such a manner that the visual information based on an event that occurs in the mobile terminal 200 is output, toward the rear surface of the terminal body, to the rear display 255*b*. In addition, the rear display 255*b* is smaller in size than a front display 251, and is formed in such a manner that comparatively-simple information is displayed on the front display. For example, the rear display 255*b* is configured in such a manner that information relating to time, an application alarm, an arriving telephone call, an arriving message, and the like is simply displayed on the rear display 255*b*. The rear display 255*b* makes up the rear display unit 255 that corresponds to the front display unit 251, along with the window 255*c* and constituent elements.

The visual information in conjunction with the front display unit 251 is output to the rear display 255*b*. For example, one portion of the visual information that is displayed on the front display unit 251 is output to the rear display 255*b*. As one example of a configuration, when a call arrives, a caller's telephone and information (a caller's name and a caller's photograph) corresponding to the information, which depends on circumstances, are output to the front display unit 251, and only the caller's name is output to the rear display 255b.

The window 255c is mounted on the frame 255a in such a manner as to cover the rear display 255b. The window 255c is made opaque except for its portion corresponding to the rear display 255b. For example, an opaque material is formed in such a manner as to cover the rear surface of the window 255c except for a portion of the window 255c that corresponds to the rear display 255b, using a printing method, a deposition method, or the like.

A touch sensor 255d is formed in such a manner that it is arranged between the window 255c and the rear display 255b to detect a touch input applied to the rear display 255b. The touch sensor 255d is electrically connected to the printed circuit board 280 by a connection and is configured from a capacitance touch sensor or a resistance touch sensor.

A button unit 234 that is formed in such a manner that the push-down operation can be performed on it is arranged adjacent to the rear display unit 255. The button unit 234 is arranged to be superimposed on the front display unit 251 in the thickness direction of the terminal body. The button unit 234 is configured to generate a control command corresponding to turning on or turning off of the front display unit 251 by the push-down operation. When the push-down operation on the button unit 234 is continued for a given time or more, the button unit 234 may be formed in such a manner as to generate the control command corresponding to the turning-on or the turning-off of the mobile terminal 200.

The button unit 234 is exposed to the outside through holes 202b and 203b. A projection portion 234a is protrusively formed on an outer edge of the button unit 234 and is configured in such a manner that the button unit 234 can be locked under the rear surface of the rear case 202. A button switch 234b against which the button actuator 234c exerts a pressure when the push-down operation is performed on the button unit 234 is provided on a rear surface of the button unit 234. The button switch 234b is provided to a printed circuit board 255e or a flexible printed circuit board.

The printed circuit board 255e is supported by an internal structural element that can provide support or as illustrated, is installed on a shield can that is installed on the printed circuit board 280. The shield can 281 is configured to cover at least one electrical element and thus prevent EMI and performs a function of supplementing robustness of the printed circuit board 280.

The camera module 221' is arranged in a position adjacent to the rear display unit 255. As illustrated, the camera module 221', the rear display unit 255, and the button unit 234 are arranged along a lengthwise direction of the terminal body. This arrangement provides uniformity and thus realizes a higher-quality back-side design.

FIGS. 5A and 5B and FIGS. 6A and 6B are diagrams illustrating examples in which information is output to the rear display unit 255.

As described above, the mobile terminal 200 is equipped not only with the front display unit 251, but also with the rear display unit 255, and thus outputs the information in more various ways. Specifically, the rear display unit 255 is usefully used in providing the user with the information when the mobile terminal 200 is placed on a surface of an object with the front display unit 251 facing downward.

Various types of information are output to the rear display unit 255. For example, alerting information that alerts the user to an occurrence of an event occurs, information on contents of the event, screen information on a function that is being performed, status information on the mobile terminal 200, and the like are output the rear display unit 255. Of course, the pieces of information described above may be output to the front display unit 251 as well. First information and second information that are described below include the pieces of information described above.

The controller 180 performs control in such a manner that when one of the front display unit 251 and the rear display unit 255 is in an ON state, the other is in an OFF state. For example, if a user's gaze is toward the rear display unit 255 in the ON state, the front display unit 251 out of the user's gaze is turned off, thereby reducing power consumption. Of course, the front display unit 251 and the rear display unit 255 may be all configured in such a manner that the information is output to them at the same time.

Figure 5:
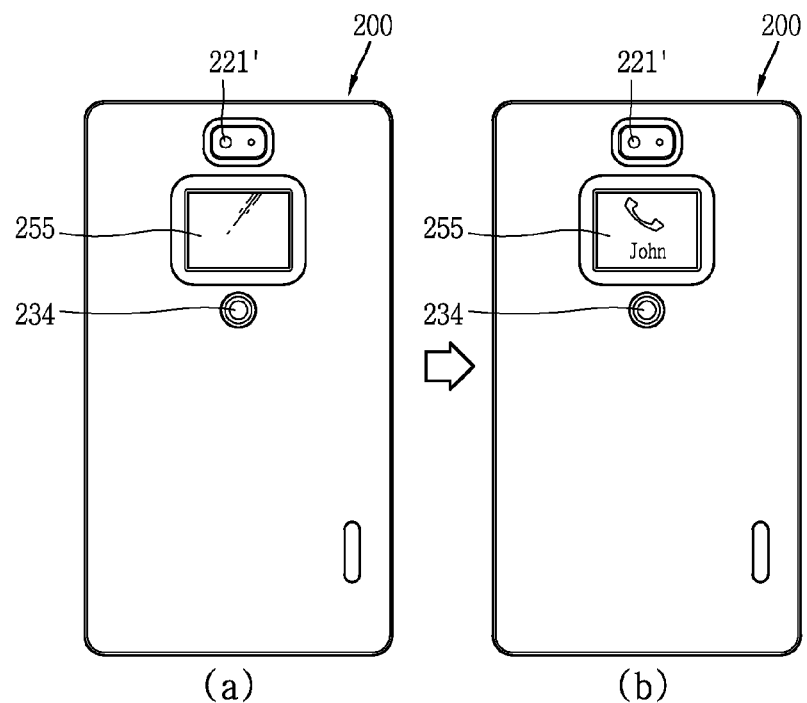
FIGS. 5A and 5B are diagrams illustrating an example in which information is output to a rear display unit in FIG. 2B.

FIGS. 5A and 5B are diagrams illustrating one example in which the alerting information that alerts the user to the occurrence of the event is output to the rear display unit 255. When a call arrives, screen information corresponding to the receiving of the call is output to the rear display unit 255. The screen information includes the alerting information that alerts the user that the call is received, the information on contents relating to the caller, and the like. The alerting information is a call receiving icon, and the information on the contents includes the caller's name, photograph, and telephone number and the like.

Figure 6:
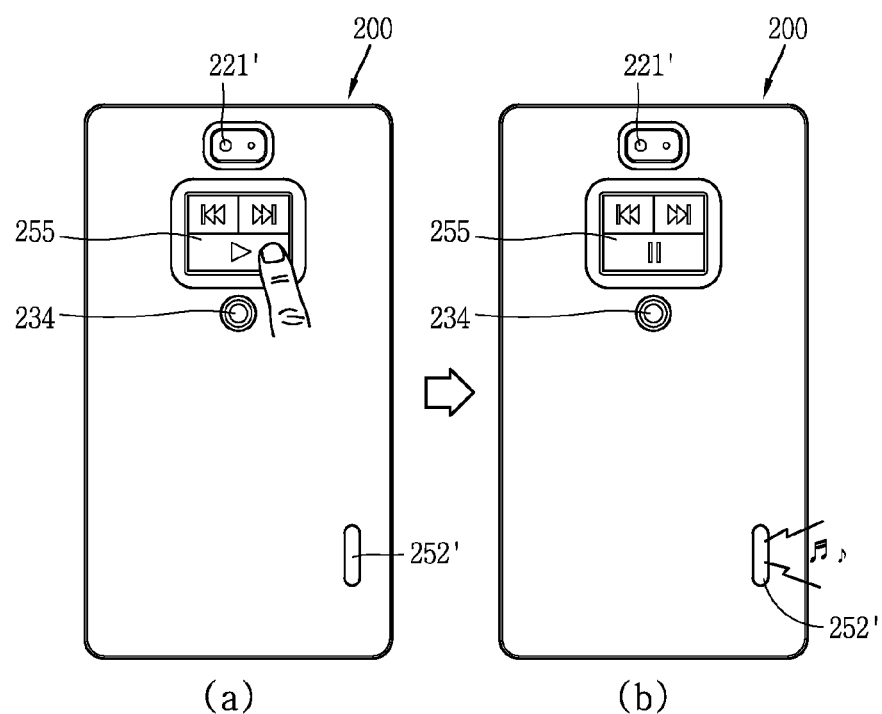
FIGS. 6A and 6B are diagrams illustrating an example in which the information is output to the rear display unit in FIG. 2B.

FIGS. 6A and 5B are diagrams illustrating one example in which the screen information on the function that is being performed is output to the rear display unit 255. If music is reproduced, the screen information relating to a reproduction function (playing, forward moving, or backward moving) is output to the rear display unit 255.

When one of the graphic objects relating to the reproduction function is selected by the operation, the corresponding function is performed and the screen information displayed on the rear display unit 255 is changed corresponding to the selection. As one example, as illustrated, when a touch is applied to a "▷"-shaped graphic object corresponding to a music reproduction function, music is reproduced, and when the "▷"-shaped graphic object is changed to a "II"-shaped graphic object corresponding to a music reproduction-stopping function.

Application of the touch input (including a single touch, a multi touch, an flicking and the like) to the rear display unit 255 is described below as one example of the operation on the rear display unit 255, but the present invention is not necessarily limited to the example. The operation on the rear display unit 255 includes not only the touch input, but also the push input.

Figure 7:
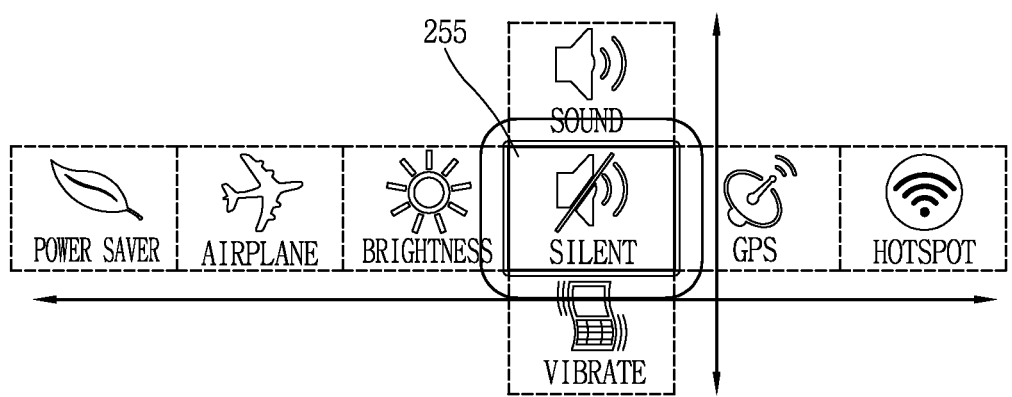
FIG. 7 is a diagram illustrating an example in which the information that is output to the rear display unit in FIG. 2B is changed by an operation.

FIG. 7 is a diagram illustrating an example in which the information that is output to the rear display unit 255 in FIG. 2B is changed.

In a state where the information is output to the rear display unit 255, when the touch corresponding to a predetermined manner is applied to the rear display unit 255, the screen information is changed. The touch corresponding to the predetermined manner is a flicking touch, or a double tap. For example, different pieces of information are output to the rear display unit 255 according to a direction of the flicking touch on the display unit 155.

As one example, as illustrated, in a state where the screen information indicating that a soundless alert is set in association with an alert mode, one of the setting modes in the mobile terminal 200, is output to the rear display unit 255, when the flicking touch is applied to the rear display unit 255 in the upward or downward direction, the screen information relating to a different alert setting (sound, vibration, and the like) is output to the rear display unit 255. In addition, when the flicking touch is applied to the rear display unit 255 in a leftward or rightward direction, the screen information relating to a different setting mode (a screen brightness adjustment, or a setting such as turning-on or turning-off of GPS) is output to the rear display unit 255.

One example of the mobile terminal 200 is described in detail below, which is capable of outputting the information to the front display unit 251 and the rear display unit 255 in more various ways using the sensing unit 140 described above.

Figure 8:
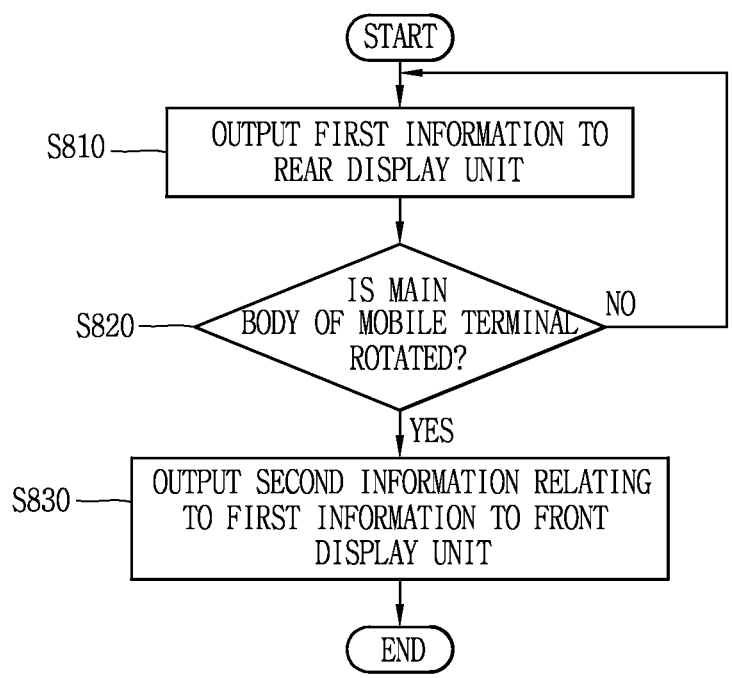
FIG. 8 is a flowchart for describing operation of the mobile terminal according to one embodiment of the present invention.
Figure 9:
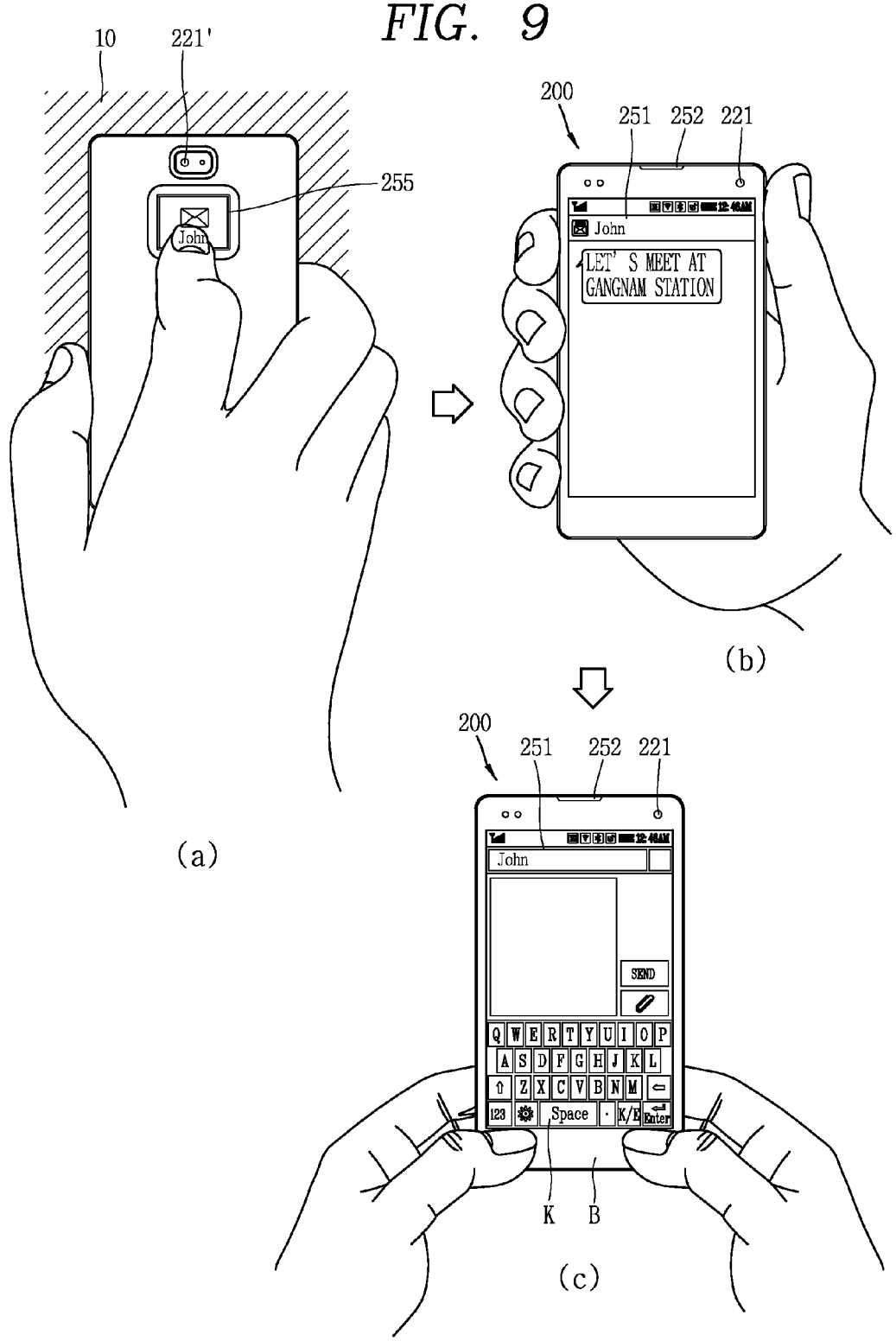
FIGS. 9A to 9C are diagrams illustrating the operation of the mobile terminal according to one embodiment of the present invention, which is illustrated in FIG. 8.
Figure 10:
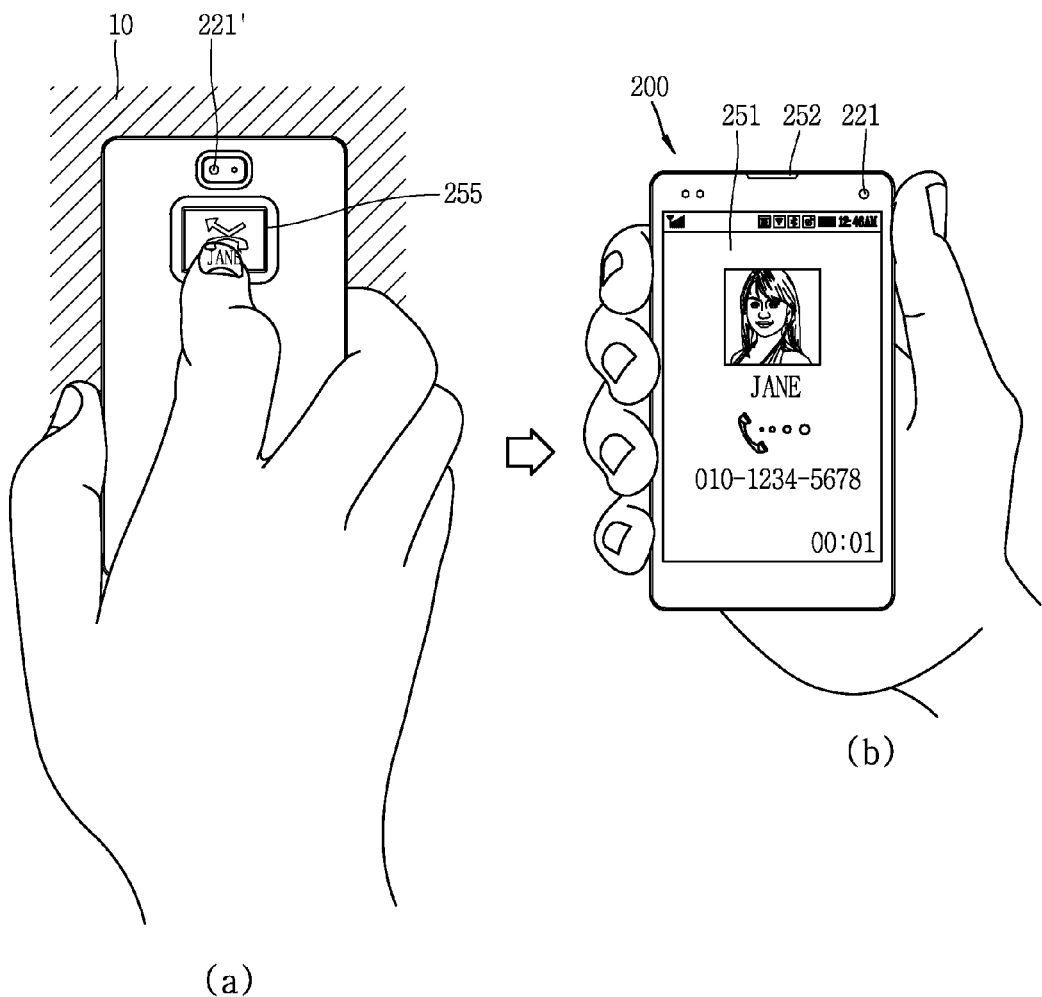
FIGS. 10A and 10B are diagrams illustrating the operation of the mobile terminal according to one embodiment of the present invention, which is illustrated in FIG. 8.
Figure 11:
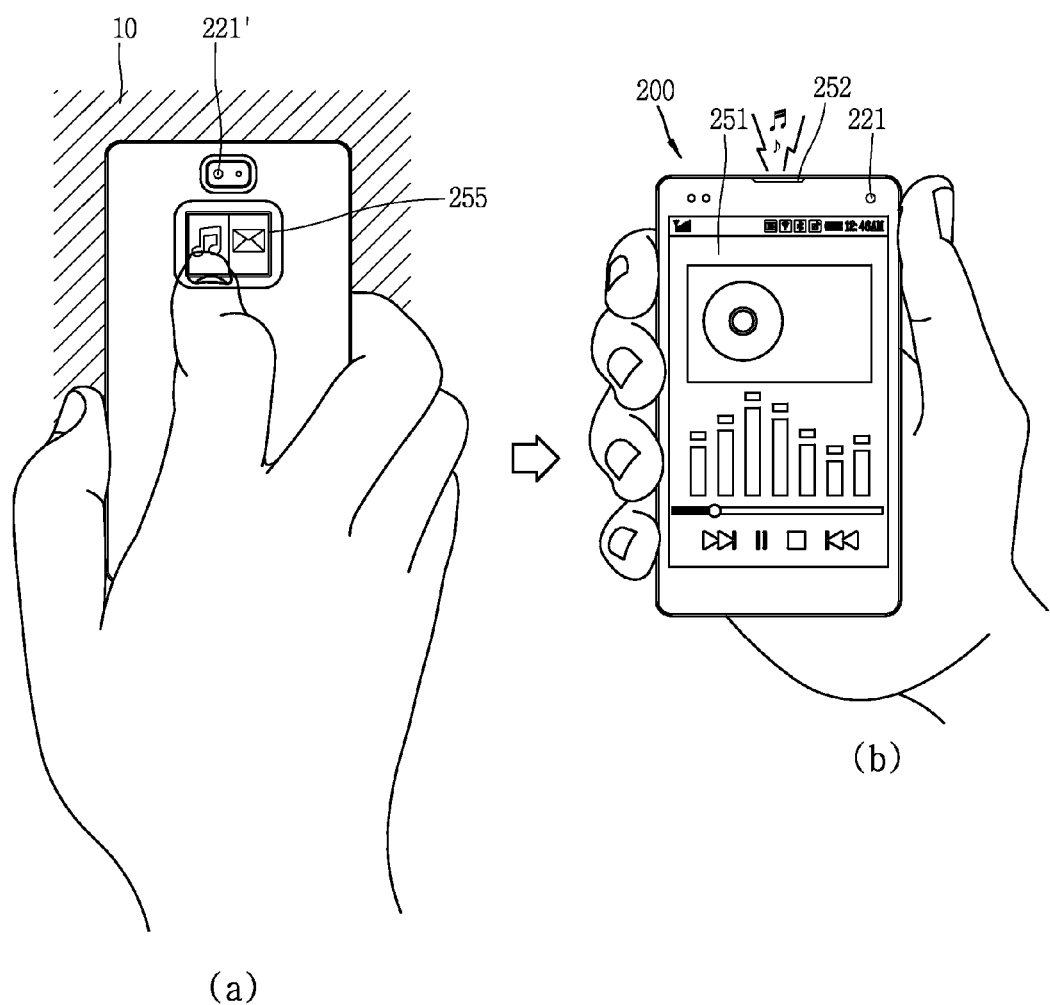
FIGS. 11A and 11B are diagrams illustrating the operation of the mobile terminal according to one embodiment of the present invention, which is illustrated in FIG. 8.
Figure 12:
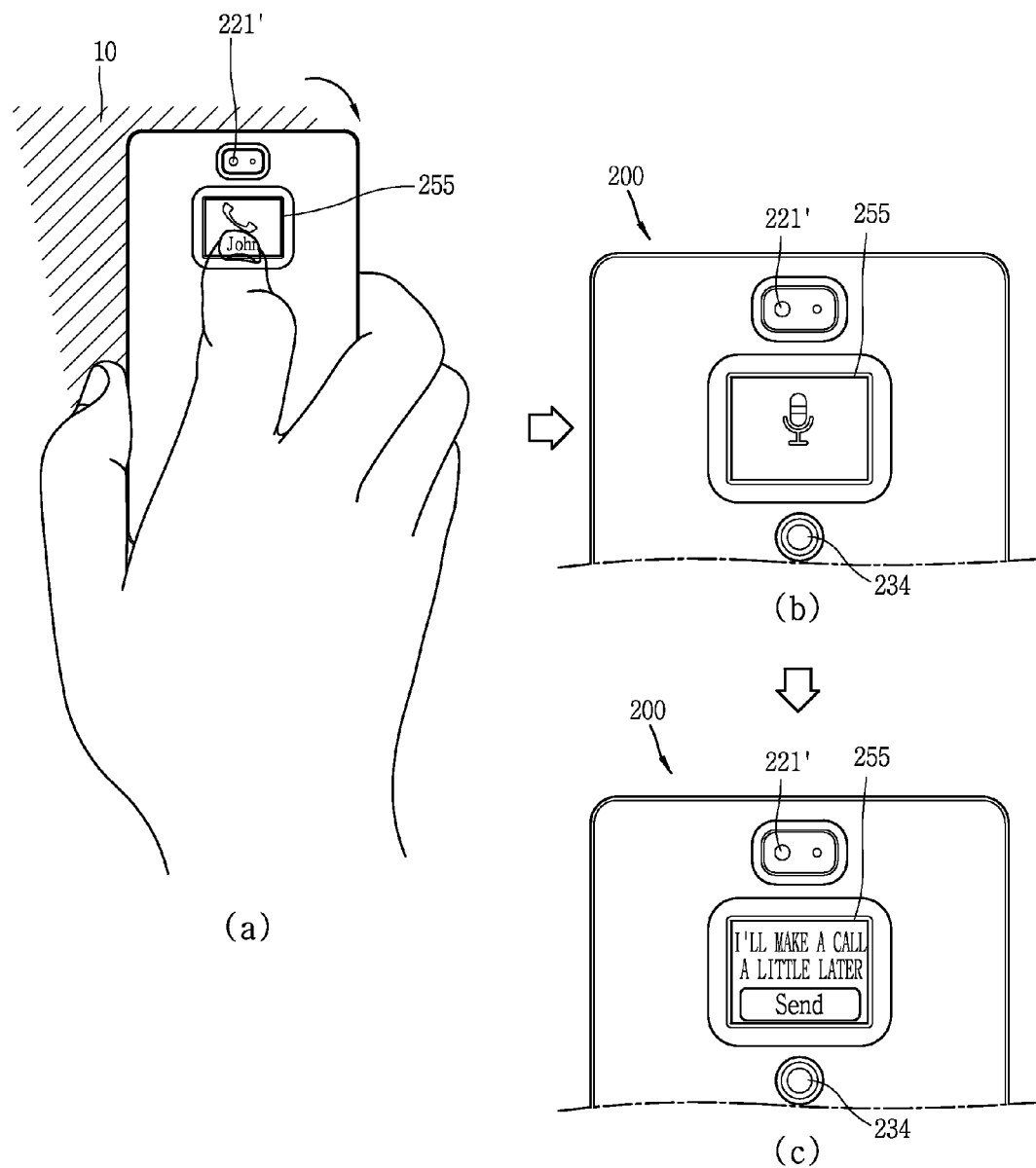
FIGS. 12A to 12C are diagrams illustrating the operation of the mobile terminal according to one embodiment of the present invention, which is illustrated in FIG. 8.

FIG. 8 is a flowchart for describing operation of the mobile terminal 200 according to one embodiment of the present invention.

Referring to FIG. 8, the first information is output to the rear display unit 255 (S810). The controller 180 performs the control in such a manner that the rear display unit 255 is turned on or turned off, according to status of the mobile terminal 200 that is sensed through the sensing unit 140. For example, when the mobile terminal 200 is placed on the surface of the object with the front display unit 251 facing downward, if the event occurs, the controller 180 turns on the rear display unit 255 and provides the user with the information relating to the event.

In a state where the first information is output to the rear display unit 255, when the terminal body is rotated (S820), the second information relating to the first information is output to the front display unit 251 (S830). The rotation refers to a case where the terminal body is rotated from a state where the front is toward one direction to a state where the rear is toward is toward the one direction. However, the rotation is not limited to the case described above, and a rotation range is set in various ways.

The sensing unit 140 is configured to sense the rotation of the terminal body, and uses at least one or more, among a proximity sensor 141, an illumination-intensity sensor 142, a gyro sensor 142, and an acceleration sensor 144 in order to perform the sensing. For example, when the mobile terminal 200 is placed on the surface of the object with the front display unit 251 facing downward, the sensing unit 140 senses that the rear display unit 255 faces upward, using the proximity sensor 141 and senses the rotation of the terminal body using at least one of the gyro sensor 143 and the acceleration sensor 144.

The sensing unit 140 may sense the rotation of the terminal body using the camera 121 as well. For example, the sensing unit 140 recognizes the user that is photographed through the camera modules 221 and 221' in the front surface and the rear surface of the terminal body senses which surface of the terminal body the user's gaze is toward.

On the other hand, when one of the front display unit 251 and the rear display unit 255 is in the ON state, the other is in the OFF state. The ON and OFF states are determined depending on whether or not the terminal body is rotated. As one example, while the first information is output to the rear display unit 255, the front display unit 251 is in the OFF state, and corresponding to the rotation of the terminal body, the front display unit 251 is switched to the ON state and thus outputs the second information, and the rear display unit 255 is switched to the OFF state.

In contrast, although the second information is output to the front display unit 251, the rear display unit 255 maintains the ON state and the first information or the changed screen information is output to the rear display unit 255.

On the other hand, in a state where the first information is output to the rear display unit 255, corresponding to the rotation of the terminal body, the controller 180 determines whether or not to output the second information to the front display unit 251, based on the touch input applied to the rear display unit 255 and the push input applied to the button unit 234. For example, only if the touch is applied to the rear display unit 255 before the rotation of the terminal body, the controller 180 outputs the second information to the front display unit 251.

The controller 180 performs the operation described above not only in a case where the terminal body is rotated with the touch applied to the rear display 255, but also in a case where the terminal body is rotated within a given time after the touch is applied to the rear display unit 255.

In addition, the controller 180 only switches the front display unit 251 from the OFF state to the ON state when the rear display unit 255 is rotated without the touch being applied to the rear display unit 255 in a state where the front display unit 251 is in the OFF state and the first information is output to the rear display unit 255.

As a result, the previously-output screen information is output to the front display unit 251. In addition, the controller 180 may be configured in such a manner that a waiting screen (a home screen) is output to the front display unit 251 according to the operation described above.

In this manner, according to the present invention, the operation of each of the front display unit 251 and the rear display unit 255 is controlled using the operation of the mobile terminal 200. Accordingly, according to the present invention, the information is transferred to the user in more various ways, and this makes it possible to realize a new type of user interface.

The mobile terminal according to one embodiment of the present invention is described in more detail below, using operational examples.

FIGS. 9A to 12C are diagrams illustrating the operation of the mobile terminal 200 according to one embodiment of the present invention, which is illustrated in FIG. 8.

Referring to FIGS. 9A to 9C, when the event occurs, the alerting information (the first information) that alerts the user to the occurrence of the event is output to the rear display unit 255. FIG. 9A illustrates that a message arrives and a graphic object that alerts the user to the receiving of the message is output the rear display unit 255 in a state where the mobile terminal 200 is placed on a surface 19 of an object with the rear display unit 255 facing upward. On the other hand, in addition to the visual ways described above, sound, vibration, or the like is generated in order to alert the user to the occurrence of the event in various ways.

Subsequently, when the terminal body is rotated, the information (the second information) on the contents of the event that occurs is output to the front display unit 251. Referring to FIGS. 9A and 9B, when the user touches on the rear display unit 255, picks up the terminal body and rotates the terminal body with the front display unit 251 facing upward, contents of the message that arrives are output to the front display unit 251. At this point, the rear display unit 255 is switched to the OFF state.

In addition, when the touch corresponding to a predetermined manner is applied to the bezel portion B surrounding the front display unit 251 in a state where the second information relating to the first information is displayed on the front display unit 251, the controller 180 performs a specific function relating to the event. As one example, referring to FIGS. 9A and 9B, when the multi touch is applied to the bezel portion B surrounding the front display unit 251 in a state where the contents of the message that arrives are output to the front display unit 251, an input window K for responding to the message that arrives is output to the front display unit 251. The input window K is, for example, a key pad including keys for letters, numbers, symbols, and the like.

Referring to FIGS. 10A and 10B, when the terminal body is rotated in a state where the first information that alerts the user to the occurrence of the event is output to the rear display unit 255, a function relating to the event is performed. At this point, the second information, screen information corresponding to the function performed is output to the front display unit 251.

For example, as illustrated in FIG. 10A, the event that occurs is an event that the call arrives during the user's absence, the alerting information that alerts the user to the receiving of the call during the user's absence is output to the rear display unit 255.

Subsequently, as illustrated in FIGS. 10A and 10B, when the user touches on the rear display unit 255, picks up the terminal body, and rotates the terminal body with the front display unit 251 facing upward, a function of making a call responding to the call during the user's absence is performed corresponding to the rotation. In addition, the screen information relating to the responding call is output to the front display unit 251.

Referring to FIG. 11A, at least one or more graphic objects relating to an application, an event, and the like are output to the rear display unit 255. FIG. 11A illustrated that a musical note-shaped graphic object relating to a music reproduction application and an envelope-shaped graphic object relating to the checking of the message that arrives are output to left and right regions of the rear display unit 255, respectively.

In this state, as illustrated in FIGS. 11A and 11B, when the user applies the touch to the front display unit 255 corresponding to the musical note-shaped graphic object in order to listen music and rotates the terminal body with the front display unit 251 facing toward the user, the music is reproduced and the screen information relating to the music reproduction is output to the front display unit 251.

On the other hand, referring to FIGS. 12A to 12C, the controller 180 executes a specific function only by a movement of the terminal body. The sensing unit 140 is configured to sense the movement of the terminal body. When the terminal body is moved in a state where the event occurs and the information that alerts the user to the occurrence of the event is output to the rear display unit 255, the controller 180 executes a function relating to the event.

As illustrated in FIG. 12A, if the event that the call arrives, the alerting information including the graphic object that alerts the user to the receiving of the call is output to the rear display unit 255. At this point, as described above referring to FIGS. 10A and 10B, when the user touches on the rear display unit 255 and rotates the terminal body with the front display unit 251 facing him/her, the mobile terminal 200 is switched to a call-receiving state where a telephone conversion is available.

However, if the user cannot answer to the call for a certain reason, as illustrated in FIGS. 12A and 12B, when the user lightly picks up the terminal body while touching on the rear display unit 255, the controller 180 senses the movement of the terminal body and activates a microphone 122. The controller 180 converts into a text message a voice that is input through the microphone 122 and then transmits the result of the conversion to the caller.

Figure 13:
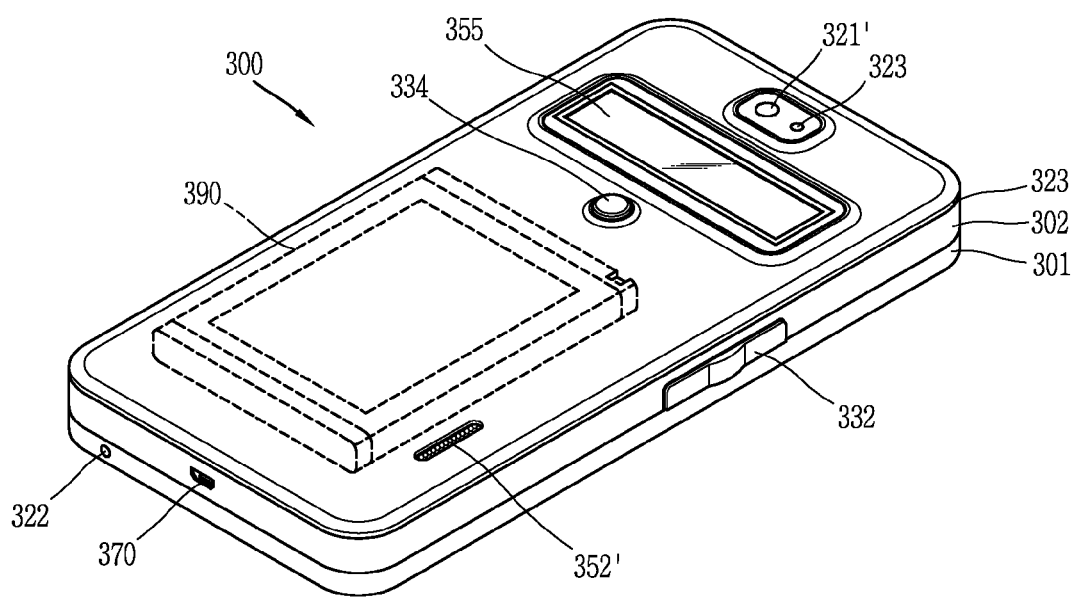
FIG. 13 is a perspective diagram illustrating a modification example of a mobile terminal according to the present invention, when viewed from the rear.

FIG. 13 is a perspective diagram illustrating a modification example of a mobile terminal 300 according to the present invention, when viewed from the rear.

Referring to FIG. 13, while the rear display unit 255 described above is almost in the form of a regular quadrilateral, a rear display unit 355 according to the present modification example extends lengthily in one direction in terms of a form. As illustrated, when the rear display unit 355 is formed lengthily in the width direction, there is an advantage in that a larger amount of information is display at a time. The rear display unit 355 is not limited to this form, but is configured to be in various forms, such as a circle, a triangle and the like.

Modification examples described below, in which the rear display unit 355, as illustrated, extends lengthily in one direction in terms of a form, only provide visual effects and are not given any limitations in being realized in the rear display unit 355 in different forms. In addition, the operation of the mobile terminal according to one embodiment, described above, can be applied to the present modification examples in the same or similar manner.

Figure 14:
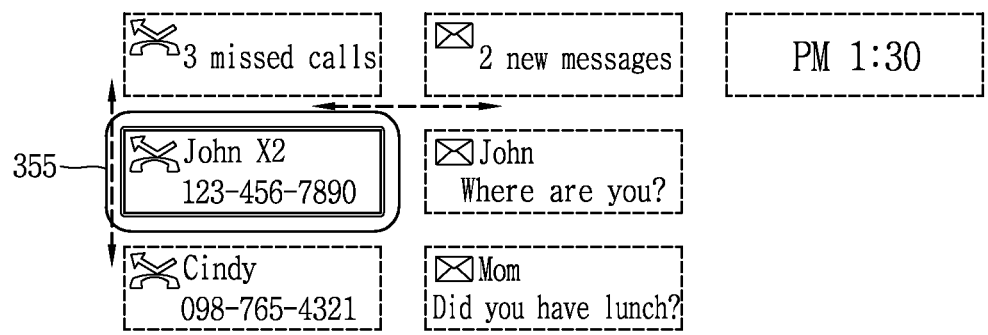
FIG. 14 is a diagram illustrating an example in which information is output to the rear display unit illustrated in FIG. 13.
Figure 15:
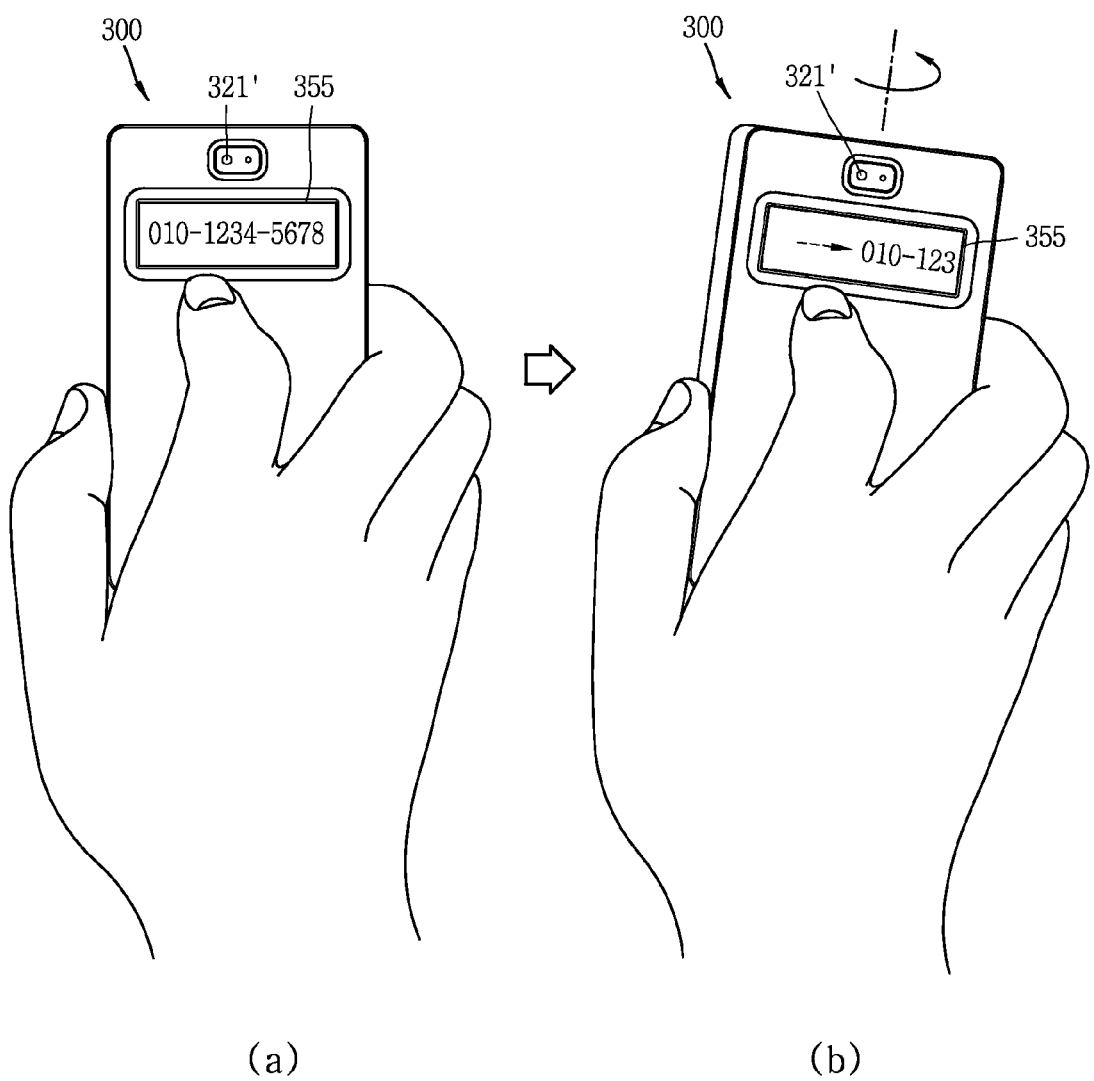
FIGS. 15A and 15B are diagrams illustrating an example in which the information is output to the rear display unit illustrated in FIG. 13.
Figure 16:
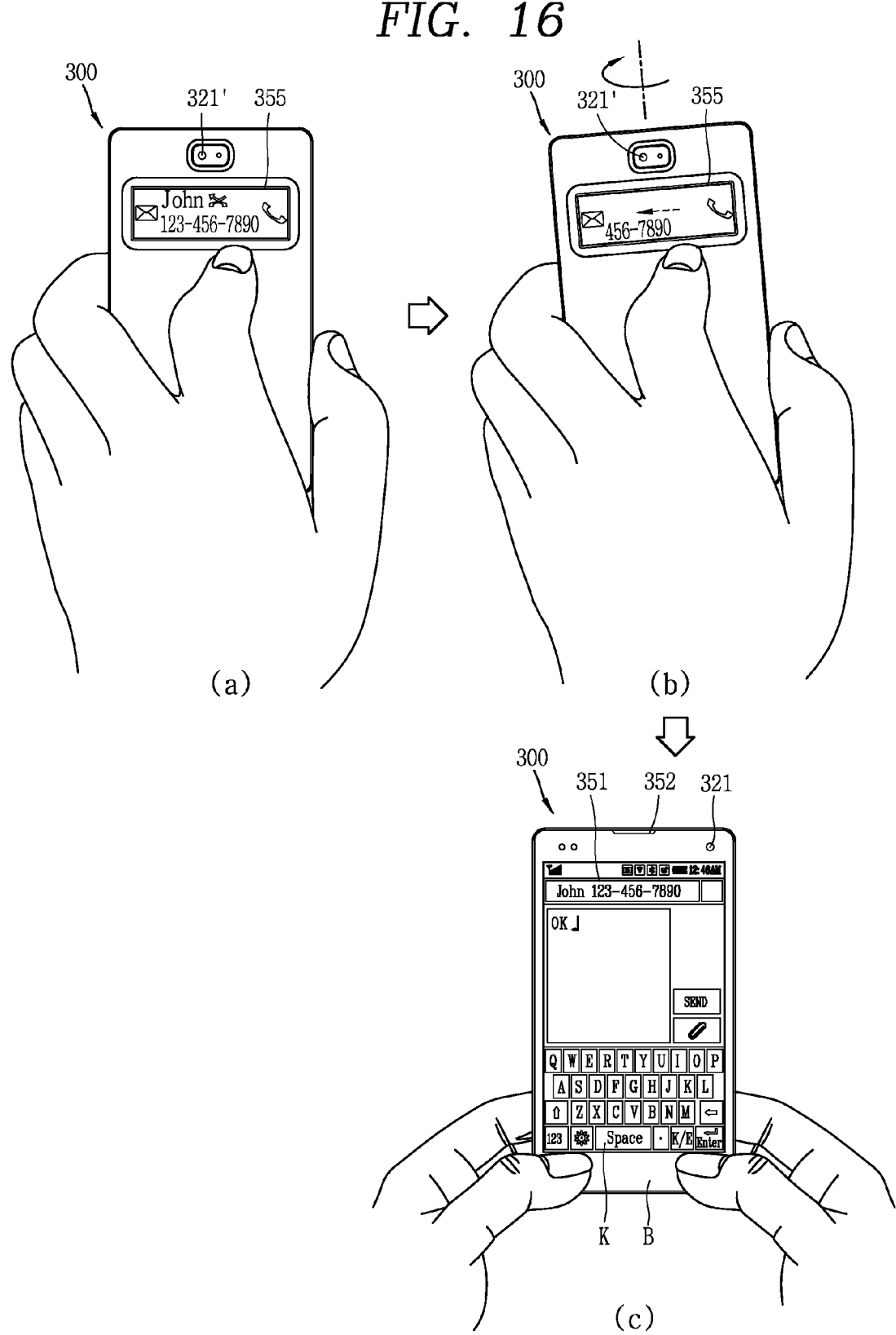
FIGS. 16A to 16C are diagrams illustrating the operation of the mobile terminal according to one embodiment of the present invention, which is illustrated in FIG. 13.
Figure 17:
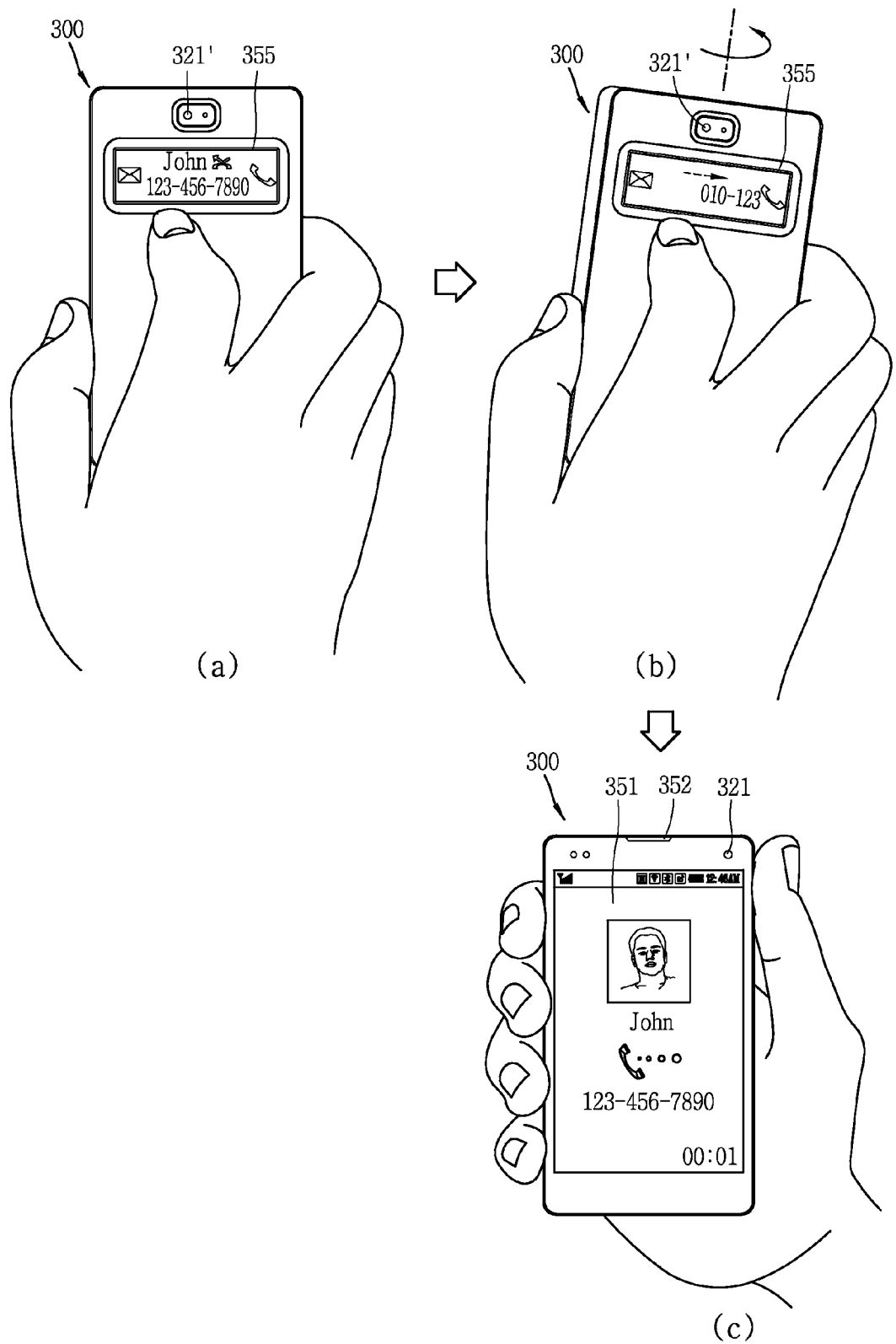
FIGS. 17A to 17C are diagrams illustrating the operation of the mobile terminal according to one embodiment of the present invention, which is illustrated in FIG. 13.
Figure 18:
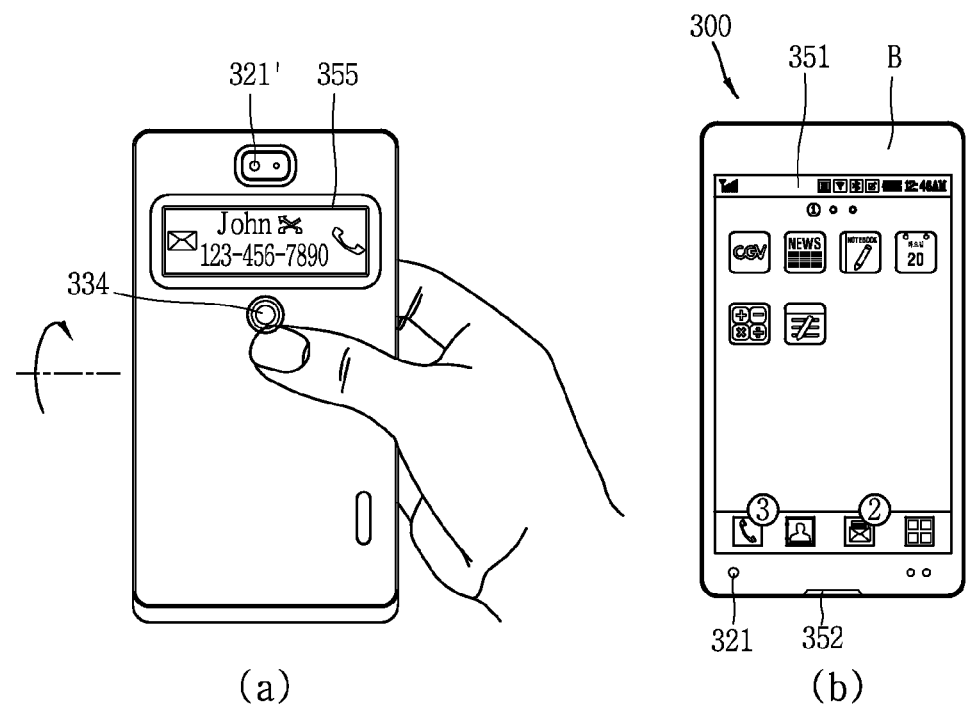
FIGS. 18A and 18B are diagrams illustrating the operation of the mobile terminal according to one embodiment of the present invention, which is illustrated in FIG. 13.

FIGS. 14 to 15B are diagrams illustrating examples in which the information is output to the rear display unit 355 illustrated in FIG. 13.

Referring to FIGS. 14 and 15B, when a touch corresponding to a predetermined manner is applied to the rear display unit 355 in a state where multiple events occur and information relating to one event, among the multiple events, is output to the display unit 355, the information relating to the one event is changed to information relating to a different event.

For example, as illustrated in FIG. 14, the rear display unit 355 is configured in such a manner that a list of calls received during the user's absence (one call received from Cindy during the user's absence and two calls received from John during the user's absence) and a list of messages (one message received from Mom and one message received from John), current time information, or the like can be displayed on the rear display unit 355.

The touch corresponding to the predetermined manner is the flicking touch. The information relating to one of the multiple events disappears from the rear display unit 355, corresponding to the flicking touch, and the information relating to the different event is output to the rear display unit 355, corresponding to the disappearance of the information relating to the one event. Based on a direction of the flicking touch applied to the rear display unit 355, the controller 180 determines the information relating to an event that is to be output to the rear display unit 355.

As one example, when the flicking touch in a first direction (in the upward direction in FIG. 14) is applied to the rear display unit 355 in a state where the number of calls received during the user's absence is displayed, the information relating to each of the calls received from John and Cindy during the user's absence are sequentially output to the display unit 355. At this point, the call received from Cindy during the user's absence is an event that occurs before the call received from John during the user's absence. That is, the pieces of information relating to the events are output to the rear display unit 355 in the order in which the events occur, corresponding to the flicking touch.

On the other hand, the information relating to the call received from John during the user's absence gradually disappears from the rear display unit 355, corresponding to the flicking touch. Along with this, the information relating to the call received from Cindy during the user's absence is gradually output to the rear display unit 355, corresponding to the disappearance.

In addition, the information that is output to the rear display unit 355 is changed according to the direction of the flicking touch. The change includes changes among pieces of information in the same category and changes among pieces of information in different categories.

As one example, when the flicking touch in the first direction is applied to the rear display unit 355, a different event that is in the same category as the one event among the multiple events is output to the rear display unit 355, and when the flicking touch in a second direction different from the first direction is applied to the rear display unit 355, a different event that is in a different category than the one event among the multiple events is output to the rear display unit 355.

As illustrated, when the flicking touch in the second direction (in the leftward direction in FIG. 14) is applied to the rear display unit 355, the information relating to the call received during the user's absence is switched to the information relating to the receiving of the message. For example, when the flicking touch in the leftward direction is applied to the rear display unit 355 in a state where the information relating to the call received from John during the user's absence, the switching to the screen on which the number of messages received is displayed is made, and when the flicking touch in the upward direction is applied in this state, the pieces of information on the messages received from John and Mom are sequentially output to the rear display unit 355.

Referring to FIGS. 15A and 15B, when the terminal body is inclined, the information that is output to the rear display unit 355 is moved in the direction in which the terminal body is included. The sensing unit 140 is configured to sense the direction in which the terminal body is inclined. The gyro sensor 143, the acceleration sensor 133 and the like are used in the sensing.

FIGS. 15A and 15B illustrates that when the terminal body is inclined while it is rotated to the right, the information that is output to the rear display unit 355 is moved toward a right end portion of the terminal body. At this point, the information that is output to the rear display unit 355 is configured to gradually disappear when reaching the right end portion. When this is done, an effect is created in which the information that is output to the rear display unit 355 appears to flow in the direction in which the terminal body is included.

A mobile terminal 300 is described in detail below, which is capable of outputting the information to a front display unit 351 and the rear display unit 355 in more various ways using the sensing unit 140.

FIGS. 16A to 18B are diagrams illustrating the operation of the mobile terminal 300 according to one embodiment, which is illustrated in FIG. 13.

The sensing unit 140 is configured to sense a rotation direction of the terminal body, and the controller 180 performs different functions according to the rotation direction of the terminal body. For example, the directional rotation is divided into two directional rotations: a clockwise rotation (hereinafter referred to as a first direction) of or a counterclockwise rotation (hereinafter referred to as a second direction) of the terminal body about an axis corresponding to a lengthwise direction of the terminal body, and a clockwise rotation (hereinafter referred to as a third direction) of or a counterclockwise rotation (hereinafter referred to as a fourth direction) of the terminal body about an axis corresponding to a width direction of the terminal body.

Referring to FIGS. 16A to 17C, when the terminal body is rotated in the first direction, the first function relating to an event is performed, and when the terminal body is rotated in a second direction different from the first direction, a second function different from the first function relating to the event is performed.

The multiple graphic objects that correspond to the first function and the second function, respectively, are output to the rear display unit 355. FIGS. 16A and 17C illustrate that if the alerting information that alerts the user that the call is received from John during the user's absence is output to the rear display unit 355, an envelope-shaped graphic object and a telephone-shaped graphic object are output to a left end portion and a right end portion of the rear display unit 355, respectively.

The envelope-shaped graphic object corresponds to a function (the first function) of transmitting a message to the call received during the user's absence, and the telephone-shaped graphic object corresponds to a function (the second function) of making a call responding to the call received during the user's absence. That is, when the user rotates the terminal body in the second direction, the controller 180 senses the rotation direction of the sensing unit 140 and thus makes a call to John, and the screen information relating to the call to John is output to the front display unit 351. Therefore, the user intuitively recognizes the icon and thus rotates the terminal body in compliance with a function that the user desired to perform.

On the other hand, as illustrated in FIGS. 16B and 16C, when the terminal body is rotated in the first direction, the information that is output to the rear display unit 355 is moved toward the envelope-shaped graphic object the corresponding to the rotational direction of the terminal body. The information described above gradually disappears from the rear display unit 355 while it is moved toward the envelope-shaped graphic object, and when the information disappears to a predetermined extent, the input window K for transmitting a message to John is output to the front display unit 351.

Conversely, as illustrated in FIGS. 17B and 17C, when the terminal body is rotated in the second direction, the information that is output to the rear display unit 355 is moved toward the telephone-shaped graphic object corresponding to the rotational direction of the terminal body. The information described above gradually disappears from the rear display unit 355 while it is moved toward the telephone-shaped graphic object, and when the information disappears to a predetermined extent, the function of making a call to John is performed. In addition, the screen information relating to the performing of the function of making a call to John is output to the front display unit 351.

On the other hand, as illustrated above in FIGS. 4A and 4B, the rear display unit 355 is configured in such a manner that it is tilted and the control command is input into it. Therefore, instead of the touch input applied to the rear display unit 355, the titling of one side of the rear display unit 355 by the push-down operation may cause a function, which corresponds to the graphic object that is output to the one side, to be performed.

In addition, as illustrated in FIGS. 18A and 18B, when the terminal body is rotated in the third direction in a state where the information relating to the call received from John during the user's absence is output to the rear display unit 355, a screen that does not relate to the event that occurs is output to the front display unit 351. For example, the screen that is previously output to the home screen or the front display unit 351 is output to the front display unit 351.

At this point, the terminal body is turned upside down with the audio output module 352 facing downward. The controller 180 rotates the information and then outputs the rotated information to the front display unit 351 in order for the user to easily check the information without rotating back the terminal body. When this is done, as described above, the front input unit is not provided to a bezel portion B surrounding the display unit, and this makes it unnecessary to distinguish between the upper and lower portions of the terminal body.

On the other hand, unchecked information including the call received from John during the user's absence is briefly output to the front display unit 351. The unchecked information is displayed to be superimposed on the screen or the home screen that is previously output, or is displayed, in the form of a letter or a symbol, on the graphic object that corresponds to the corresponding function on the home screen.

According to the present embodiment, it is assumed that the rotation of the terminal body in the fourth direction creates the same effect as when the rotation of the terminal body in the third direction. However, the present invention is not necessarily limited to this assumption. When the terminal body is rotated in the fourth direction in a state where the information relating to the call received from John during the user's absence is output to the rear display unit 355, the unchecked information including the call received from John during the user's absence may be output, comparatively in detail, to the front display unit 351.

Another example of the mobile terminal 300 is described in detail, in which is capable of outputting the information to the front display unit 351 and the rear display unit 355 in more various ways using the sensing unit 140 described above. A redundant description of features of the mobile terminal 300 described above is omitted.

Figure 19:
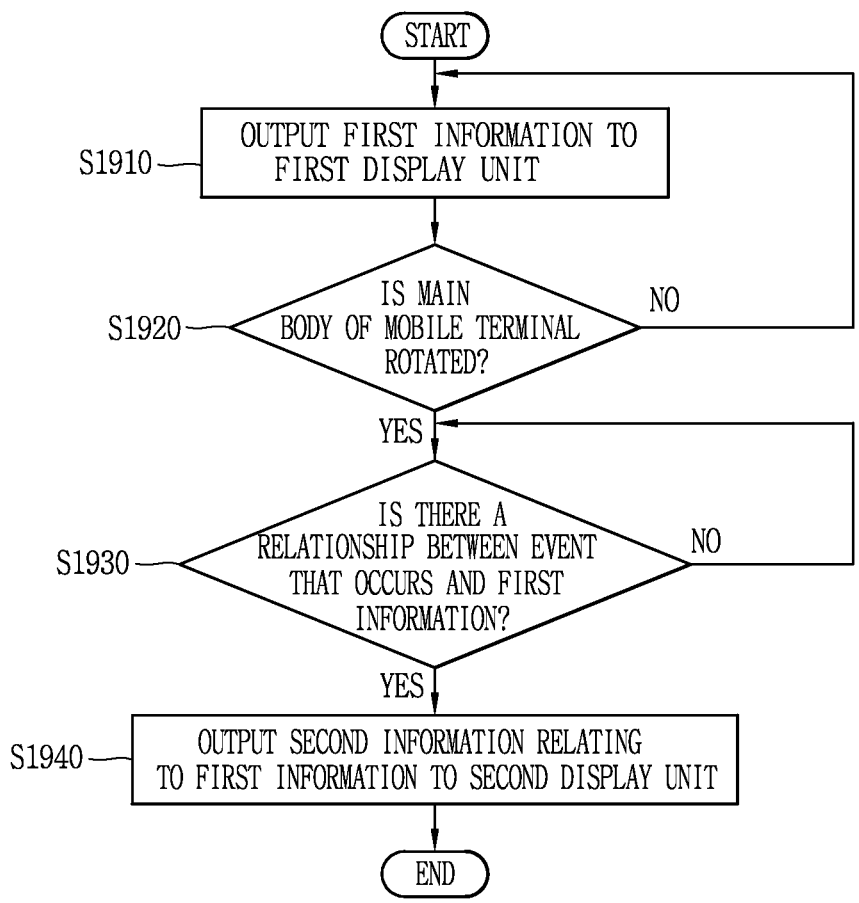
FIG. 19 is a flow chart for describing the operation of the mobile terminal according to another embodiment of the present invention.

FIG. 19 is a flow chart for describing the operation of the mobile terminal 300 according to another embodiment of the present invention.

A first display unit and a second display unit that are configured in such a manner that the information is output to them are arranged on the both sides of the terminal body, respectively. The first display unit and the second display unit are different in size and shape from each other, and are arranged in such a manner that at least one portion of the first display unit and at least one portion of the second display unit are superimposed on each other.

The operation of the mobile terminal according to one embodiment of the present invention is described in which the first display unit and the second display unit are provided on the front side and the rear side of the terminal body, respectively. That is, the first display unit and the second display unit correspond to the front display unit 351 and the rear display unit 355 that are described above, respectively. However, the first display unit and the second display unit are not necessarily limited to this arrangement. The first display unit and the second display unit can be provided on the rear side and the front side of the terminal body, respectively.

Referring to FIG. 19, the first information is output to the first display unit (S1910). At this point, the second display unit is in the OFF state. For example, if the user of the first display unit is recognized through a front camera module 321, the controller controls the second display unit in such a manner that the second display unit is in the OFF state.

The sensing unit 140 is configured in such a manner that when the terminal body is rotated in a state where the first information is output to the first display unit, the sensing unit 140 senses this rotation (S1920). Subsequently, when the event occurs, the controller 180 performs the control to determine whether or not to output the second information relating to the event that occurs in the second display unit, using a relationship between the event that occurs and the first information (S1930). That is, the controller 180 performs the control in such a manner that when the relationship is present between the event that occurs and the first information, the second information relating to the event that occurs in the second display unit is output, and performs the control in such a manner that when the relationship is present between the event that occurs and the first information, the second information relating to the event that occurs in the second display unit is in a non-outputting state (S1940). At this point, the non-outputting state refers to a state where the second information is not output to the second display unit. That is, when the mobile terminal 300 is rotated again later, the information relating to the event that occurs is output to the first display unit in a different manner.

On the other hand, after the terminal body is rotated in a state where the first information is output to the first display unit, corresponding to an occurrence of an event, the controller 180 determines whether or not to output the second information to the second display unit, based on the touch applied to the first display unit. For example, only if the touch is applied to the first display unit before the rotation of the terminal body, the controller 180 outputs the second information to the second display unit.

On the other hand, when one of the first display unit and the second display unit is in the ON state, the other is in the OFF state. The ON and OFF states are determined depending on whether or not the terminal body is rotated. That is, while the first information is output to the first display unit, the second display unit is in the OFF state, and corresponding to the rotation of the terminal body, the second display unit is switched to the ON state and thus outputs the second information, and the first display unit is switched to the OFF state.

In contrast, although the second information is output to the second display unit, the first display unit maintains the ON state and the first information or the changed screen information is output to the first display unit.

The mobile terminal according to one embodiment of the present invention is described in more detail below, using operational examples.

FIGS. 20A to 20D are diagrams illustrating the operation of the mobile terminal 300 according to one embodiment of the present invention, which is illustrated in FIG. 19. FIG. 21 is a table indicating an example in which the control is performed to determine whether or not to output the second information according to the relationship between the first information and the event that occurs.

Figure 20:
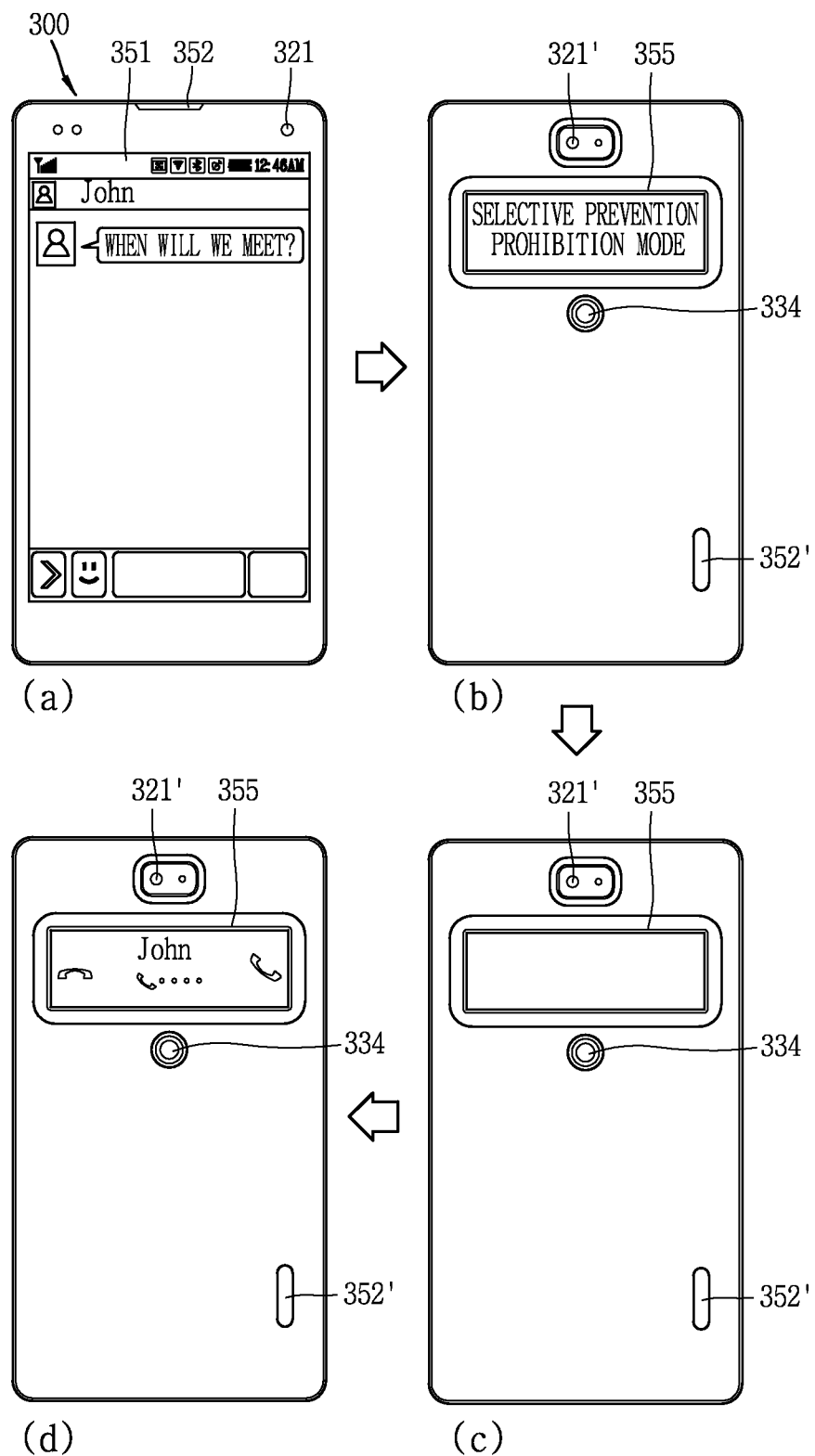
FIGS. 20A to 20D are diagrams illustrating the operation of the mobile terminal according to one embodiment of the present invention, which is illustrated in FIG. 19.
Figures 21, 22:
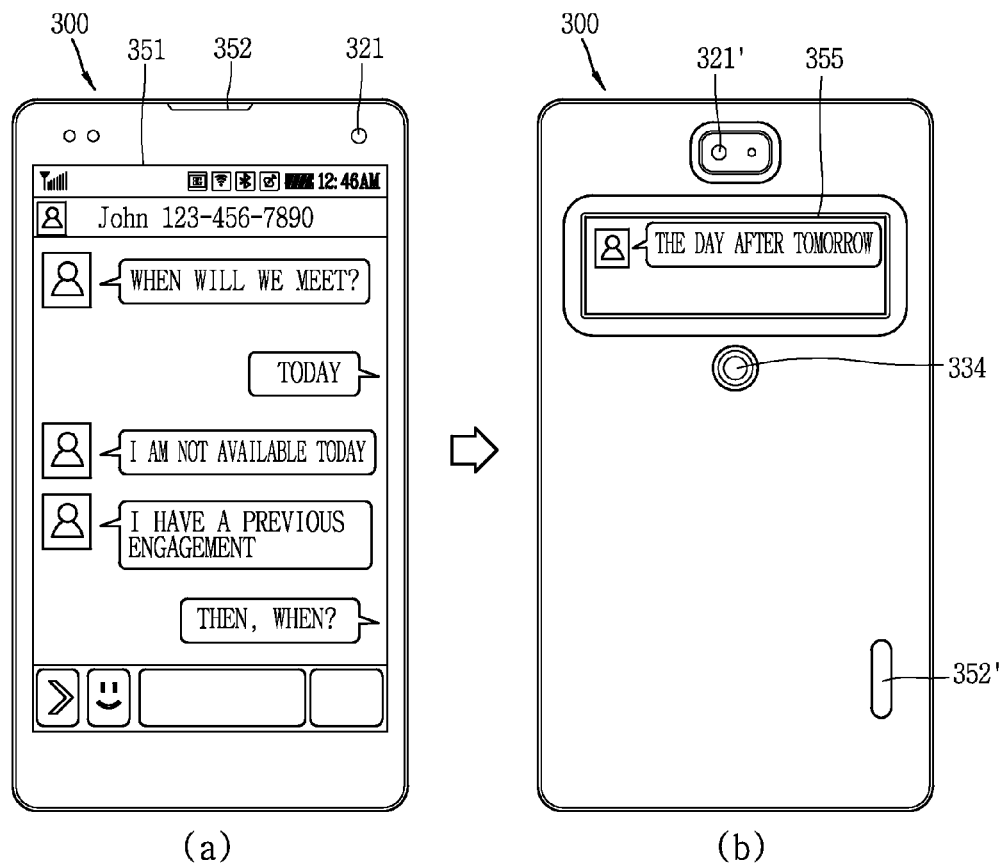
FIG. 21 is a table illustrating an example in which control is performed to determine whether or not to output second information according to a relationship between first information and an event that occurs.

Referring to FIGS. 20A and 20B, after (or while) the touch is applied to the front display unit 351 in a state where the information on the contents of the message received from John is output to the front display unit 351, when the terminal body is turned upside down, the control is performed in such a manner that only if an event that occurs subsequently relates to an event relating to John, the second information relating to the event is output to the rear display unit 355. As illustrated in FIG. 20B, the mobile terminal 300 is understood as entering a selective No-disturbance mode, and information that alerts the user that the selective No-disturbance mode is activated on the rear display unit 355 is output for a given time.

In the mobile terminal according to one embodiment of the present invention, it is determined whether or not the event that occurs is an event relating to the first information, based on the relationship with the other party (the person at the other end of the call). However, the basis for the determination is not necessarily limited to the relation with the other party. The relationship between the first information and the event is determined by a relationship in functionality (for example, all pieces of information relating to all messages received as well as information on John are output to the rear display unit 355, based on a relationship in message functionality, That is, the alerting information is not output according to the relationship if a call from John is not received) as well.

As illustrated in FIG. 20C, after the terminal body is turned upside down, even though a call is received from Cindy, the alerting information that alerts the user that the call is received is not output to the rear display unit 355. However, when the mobile terminal 300 is rotated again later, the alerting information is output in a different manner, such as one that output the alerting information to the front display unit 351.

However, as illustrated in FIG. 20D, when a call is received from John, the alerting information that alerts the user that the call is received from John is output to the rear display unit 355. In this case, as described above according to the embodiments, when the terminal body is rotated in the first direction, the first function relating to an event is performed, and when the terminal body is rotated in the second direction different from the first direction, the second function different from the first function relating to the event is performed.

In addition, the multiple graphic objects that correspond to the first function and the second function, respectively, are output to the rear display unit 355. FIGS. 20A and 20D illustrate that if the alerting information that alerts the user that the call is received from John is output to the rear display unit 355, a graphic object corresponding to a receiving limiting function and a graphic object corresponding to a call connection function are output to the left end portion and the right end portion of the rear display unit 355, respectively.

Referring to FIG. 21, the outputting of the second information relating to the first information is performed if an event relating to the first information occurs a number of multiple times.

For example, after (or while) the user checks information on contents of a message received from John through the front display unit 351 and, before starting a meeting, applies the touch to the front display unit 351 to which the information on the contents is output, when the terminal body is turned upside down, the control is performed in such a manner that only if an event that relates to John occurs a number of multiple times (according to the present embodiment, the event is assumed to occur two times) subsequently, the second information relating to the event is output to the rear display unit 355.

The number of times that the event occurs is counted regardless of a type of event as long as the event relates to the first information. As illustrated in the table, if the receiving of the call from John and the receiving of the message from John occur sequentially, the alerting information that alerts the user that the call is received from John is not output to the rear display unit 355 (the alerting information can be output later in a different manner), and the alerting information that alerts the user that the message is received from John is output to the rear display unit 355.

Alternatively, the number of times that the event occurs is set to be counted only if the events that relate to the first information and that occur are of the same kind.

FIGS. 22A to 22B are diagrams illustrating the operation of the mobile terminal 300 according to one embodiment of the present invention, which is illustrated in FIG. 19.

Referring to FIGS. 22A and 22B, after (or while) the touch is applied to the front display unit 351 in a state where a window for a message conversation with John is output to the front display unit 351, when the terminal body is turned upside down, the control is performed in such a manner that a message that is received subsequently from John is output to the rear display unit 355.

That is, screen information that relates to an application that is executed on the front display unit 351 is output to the rear display unit 355. The screen information is based on an event that occurs after the terminal body is rotated, and is, for example, contents of a new message that is received in a case of receiving a message.

The mobile terminal described above is not limited to the configurations and manners of the embodiments described above, but all of or some of the embodiments may be selectively combined with each other to create various modifications to the embodiments.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
   a terminal body having a front surface and a rear surface;
   a front display located at the front surface of the terminal body;
   a rear display located at the rear surface of the terminal body;
   a sensor configured to detect rotation of the mobile terminal; and
   a controller configured to:
   cause the rear display to turn on if an event occurs in a state where the front display faces a surface of an object;
   cause the rear display to display a first information related to the event;
   detect when the mobile terminal is rotated from a state where the front surface is facing one direction to a state where the rear surface is facing the one direction; and
   cause the front display to turn on and to display different types of information based on whether the rear display displaying the first information is touched while the mobile terminal is rotated,
   wherein a second information related to the first information and the event is displayed on the front display if the rear display displaying the first information is touched while the mobile terminal is rotated, wherein a waiting screen information or previously-output screen information is displayed on the front display if the rear display displaying the first information is not touched while the mobile terminal is rotated, and;

wherein when one of the front display or the rear display is in an ON state, the other of the front display or the rear display is in an OFF state.

2. The mobile terminal of claim 1, wherein the controller is further configured to:
change one of the front display or the rear display to an ON state when the mobile terminal is rotated a threshold amount; and
change the other of the front display or the rear display to an OFF state.

3. The mobile terminal of claim 2, wherein the threshold amount is in the range of 90 to 180 degrees.

4. The mobile terminal of claim 1, wherein the first information comprises an alert of the event, and the second information comprises information related to the event.

5. The mobile terminal of claim 4, wherein:
the rear surface comprises a bezel portion configured to receive touch inputs and surrounding at least a portion of the front display; and
the controller is further configured to perform a function related to the event in response to a touch input to the bezel portion received while the second information is displayed on the rear display.

6. The mobile terminal of claim 5, wherein:
the event comprises a received message;
the alert comprises a graphic object providing information of the received message, and
the controller is further configured to cause the rear display to display content of the received message when the mobile terminal is rotated a threshold amount.

7. The mobile terminal of claim 6, wherein the controller is further configured to cause the rear display to display an input window configured to receive a response to the received message in response to a multi-touch input to the bezel portion received while the content of the received message is displayed on the rear display.

8. The mobile terminal of claim 1, wherein:
the first information comprises an alert of the event; and
the controller is further configured to cause the rear display to display the second information and perform a function related to the event when the mobile terminal is rotated [a threshold amount.

9. The mobile terminal of claim 8, wherein the controller is further configured to change the displayed second information to information corresponding to the performed function.

10. The mobile terminal of claim 8, wherein:
the event comprises an incoming call;
the first information comprises at least an alert when the incoming call is unanswered; and
the controller is further configured to cause the rear display to display the second information when the mobile terminal is rotated the threshold amount;
wherein the second information comprises at least information related to initiating a call in response to the unanswered incoming call.

11. The mobile terminal of claim 8, wherein the controller is further configured to perform one of a plurality of functions related to the event according to rotation of the mobile terminal detected by the sensing unit, each of the plurality of functions corresponding to a particular direction of rotation of the mobile terminal.

12. The mobile terminal of claim 11, wherein:
the first information comprises at least one icon each corresponding to a function of the plurality of functions; and
the controller is further configured to cause each of the at least one icon to be displayed on a portion of the front display corresponding to a direction of rotation of the mobile terminal corresponding to the function associated with the icon.

13. The mobile terminal of claim 12, wherein the controller is further configured to:
select an icon of the at least one icon in response to the sensing unit detecting rotation of the mobile terminal in a direction corresponding to the selected icon when the mobile terminal is rotated the threshold amount; and
cause at least a portion of the displayed first information to be moved toward the icon being selected in response to the sensing unit detecting rotation of the mobile terminal in the corresponding direction.

14. The mobile terminal of claim 13, wherein the controller is further configured to:
cause the front display to gradually remove the at least the portion of the first information as it is moved toward the selected icon; and
perform the function corresponding to the selected icon when the icon is selected.

15. The mobile terminal of claim 1, wherein:
the front display is further configured to receive touch inputs;
the event is a first event of a plurality of events of a first category and the first information comprises information related to the first event; and
the controller is further configured to cause the front display to display information related to a second event of the plurality of events of the first category in response to a touch input received via the front display.

16. The mobile terminal of claim 15, wherein:
the received touch input comprises a flicking touch input gesture; and
the controller is further configured to cause the front display to display information related to the second event in response to a flicking touch input gesture in a first direction or a second direction.

17. The mobile terminal of claim 16, wherein:
the first direction and second direction are opposite directions; and
the controller is further configured to cause the front display to display information related to at least a second category of events in response to a flicking touch input gesture in a third direction or a fourth direction;
wherein the third direction and the fourth direction are opposite directions.

* * * * *